United States Patent
Brown et al.

(10) Patent No.: US 10,268,534 B2
(45) Date of Patent: Apr. 23, 2019

(54) METHODS AND SYSTEMS THAT USE VOLATILE EVENT TYPES IN LOG FILES TO NARROW A SEARCH FOR POTENTIAL SOURCES OF PROBLEMS IN A DISTRIBUTED COMPUTING SYSTEM

(71) Applicant: VMware, Inc., Palo Alto, CA (US)

(72) Inventors: Darren Brown, Seattle, WA (US); Jeremy OlmstedThompson, New York, NY (US); Nicholas Kushmerick, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 127 days.

(21) Appl. No.: 15/366,640

(22) Filed: Dec. 1, 2016

(65) Prior Publication Data
US 2018/0157544 A1  Jun. 7, 2018

(51) Int. Cl.
G06F 11/00 (2006.01)
G06F 11/07 (2006.01)
G06F 17/30 (2006.01)

(52) U.S. Cl.
CPC ...... *G06F 11/0709* (2013.01); *G06F 11/0751* (2013.01); *G06F 11/0781* (2013.01); *G06F 11/0793* (2013.01); *G06F 17/30575* (2013.01)

(58) Field of Classification Search
CPC ............. G06F 11/0709; G06F 11/0751; G06F 11/0781; G06F 11/0793; G06F 11/079; G06F 11/3006; G06F 11/3065; G06F 11/3072; G06F 17/30368; G06F 17/30424
See application file for complete search history.

(56) References Cited

U.S. PATENT DOCUMENTS

| | | | |
|---|---|---|---|
| 2010/0223449 A1* | 9/2010 | Park | G06F 9/3836 712/244 |
| 2016/0196174 A1* | 7/2016 | Jacob | G06F 11/0781 714/37 |
| 2017/0083390 A1* | 3/2017 | Talwadker | G06F 11/079 |
| 2017/0249200 A1* | 8/2017 | Mustafi | G06F 11/0709 |
| 2017/0364402 A1* | 12/2017 | Chua | G06F 11/079 |

* cited by examiner

*Primary Examiner* — Joseph D Manoskey

(57) ABSTRACT

Methods and systems to narrow a search for potential sources of problems in a distributed computing system are described. A volatile event type of event messages recorded in an event-log file is identified. The volatile event type is an event type that may have unexpectedly increased in frequency over an observation time window. An historical period of time may be selected to search for potential sources of the volatile event type. Frequencies of event messages in the event-log file with the same event type as the volatile event type are determined for time intervals of the historical period of time. A time interval of the historical period of time with a largest increase in frequency of event messages is identified. A list of event messages of the event-log file in a selected sub-time interval of the sub-time intervals of the time interval are displayed in a graphical user interface.

18 Claims, 28 Drawing Sheets

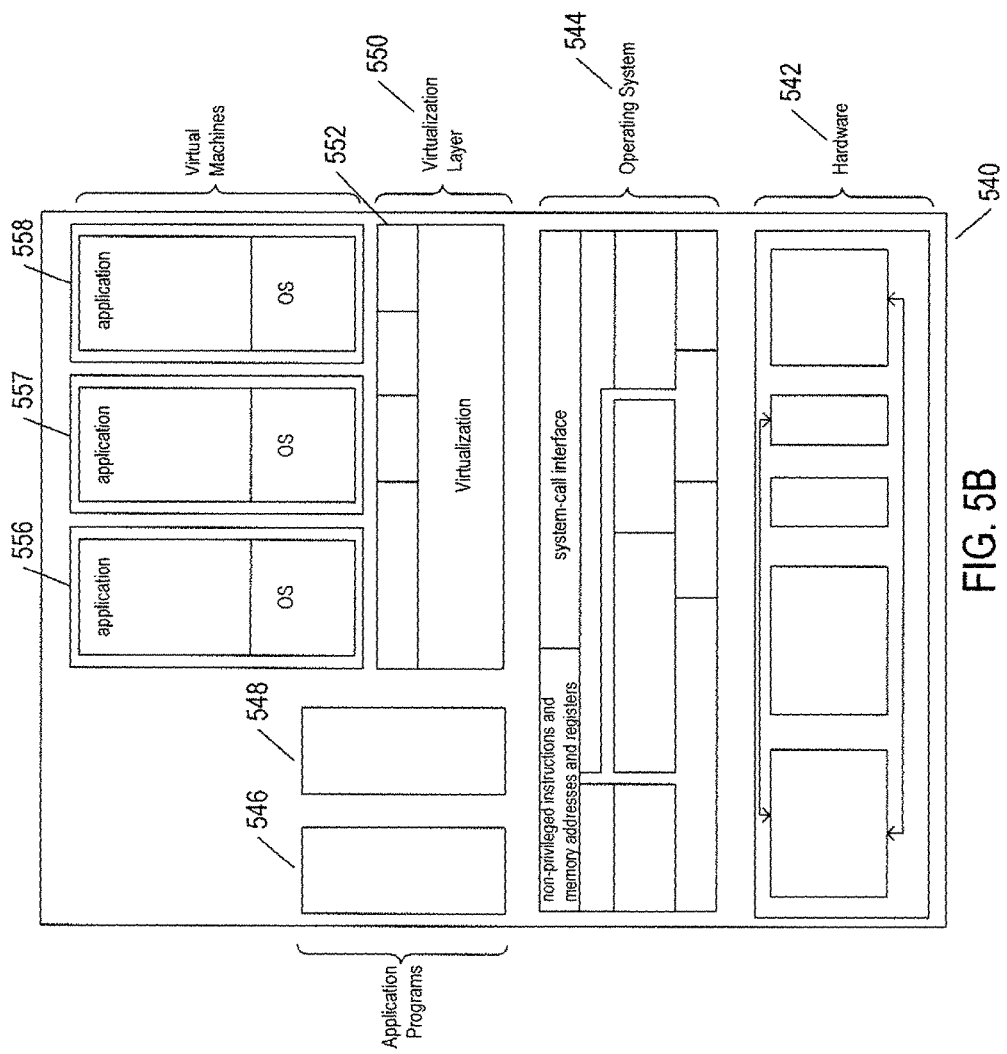

log.write([[$Time_date] [Thread—$X/$IP/INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [$Time_date] Repair session $RS for range $range finished)

FIG. 13

[2015-03-10 23:43:36.859+0000] [Thread—1822496/127.0.0.1 INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [2015-03-10 23:43:36,716] Repair session 51312720-c77e-11e4-ad72-4769d614a3f2 for range (-6899937477723537626, -6896547230076663429) finished]

FIG. 14

METHODS AND SYSTEMS THAT USE VOLATILE EVENT TYPES IN LOG FILES TO NARROW A SEARCH FOR POTENTIAL SOURCES OF PROBLEMS IN A DISTRIBUTED COMPUTING SYSTEM

TECHNICAL FIELD

The present disclosure is directed to event messages and log files and, in particular, to methods that use event types of log files identified as volatile event types in order to narrow a search for potential sources of problems in a distributed computing system.

BACKGROUND

During the past seven decades, electronic computing has evolved from primitive, vacuum-tube-based computer systems, initially developed during the 1940s, to modern electronic computing systems in which large numbers of multi-processor server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. It is often a challenging task for system administrators, system designers and developers, and system users to identify information within the enormous event logs generated in distributed computing systems relevant to detecting and diagnosing operational anomalies and useful in administering, managing, and maintaining distributed computer systems.

SUMMARY

Methods and systems to narrow a search for potential sources of problems in a distributed computing system are described. A volatile event type of event messages recorded in an event-log file are identified. The volatile event type is an event type that may have unexpectedly increased in frequency over an observation time window. An historical period of time may be selected to search for potential sources of the volatile event type. Frequencies of event messages in the event-log file with the same event type as the volatile event type are determined for time intervals of the historical period of time. A time interval of the historical period of time with a largest increase in frequency of event messages is identified. Frequencies of event messages of the event-log file in sub-time intervals of the time interval are determined. A list of event messages in a selected sub-time interval of the sub-time intervals of the time interval are displayed in a graphical user interface.

DESCRIPTION OF THE DRAWINGS

FIGS. 5A-5B show two types of virtual machine and virtual-machine execution environments.

FIG. 13 shows an example of a log write instruction.

FIG. 14 shows an example of an event message generated by the log write instruction of FIG. 13.

DETAILED DESCRIPTION

Figure 1:
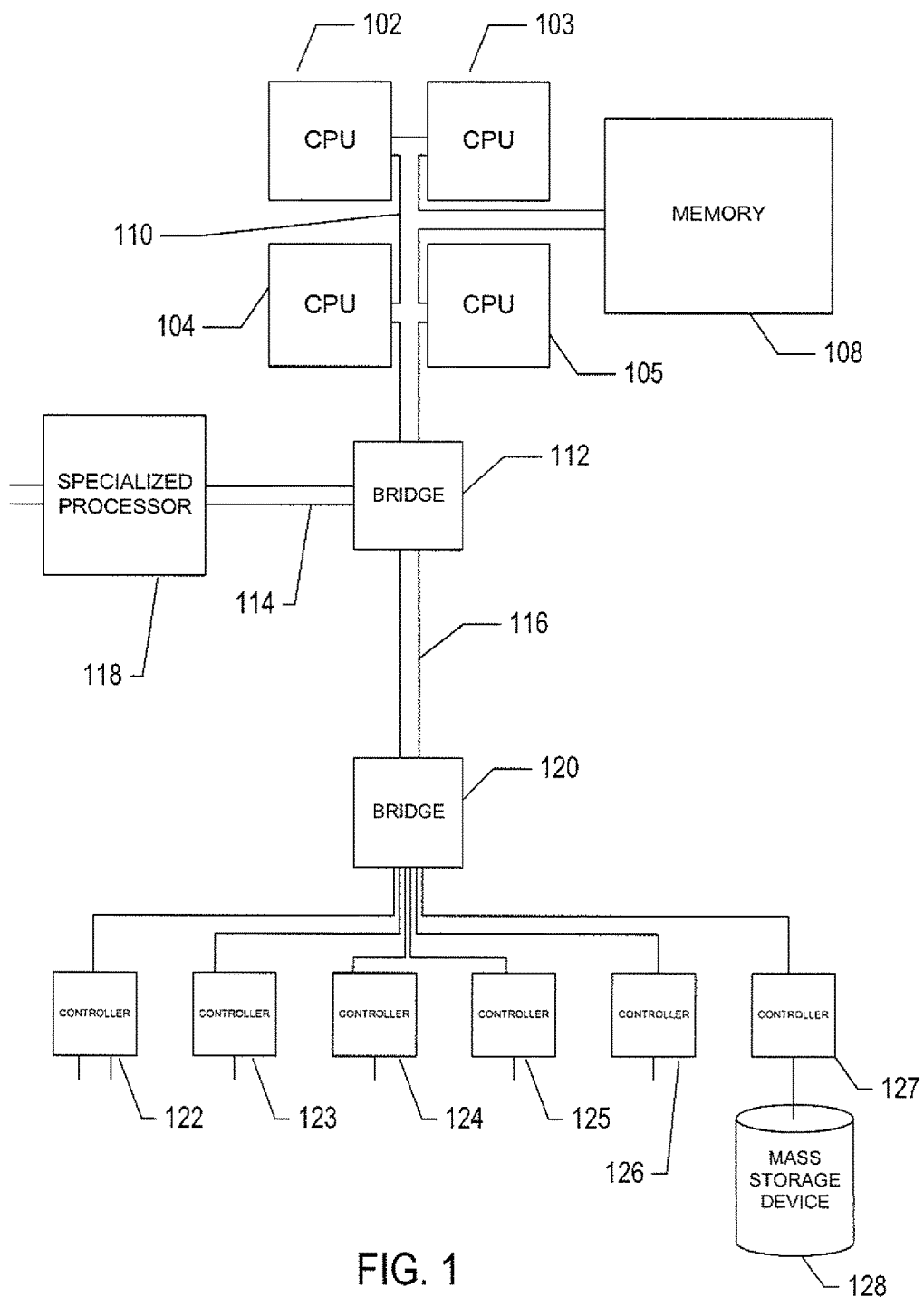
FIG. 1 shows a general architectural diagram for various types of computers.

This disclosure presents computational methods and systems that use event types of log files identified as volatile in order to narrow a search for potential sources of problems in a distributed computing system. In a first subsection, computer hardware, complex computational systems, and virtualization are described. Methods and systems to narrow a search for potential sources of problems in a distributed computing system based on volatile event types in log files are described in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
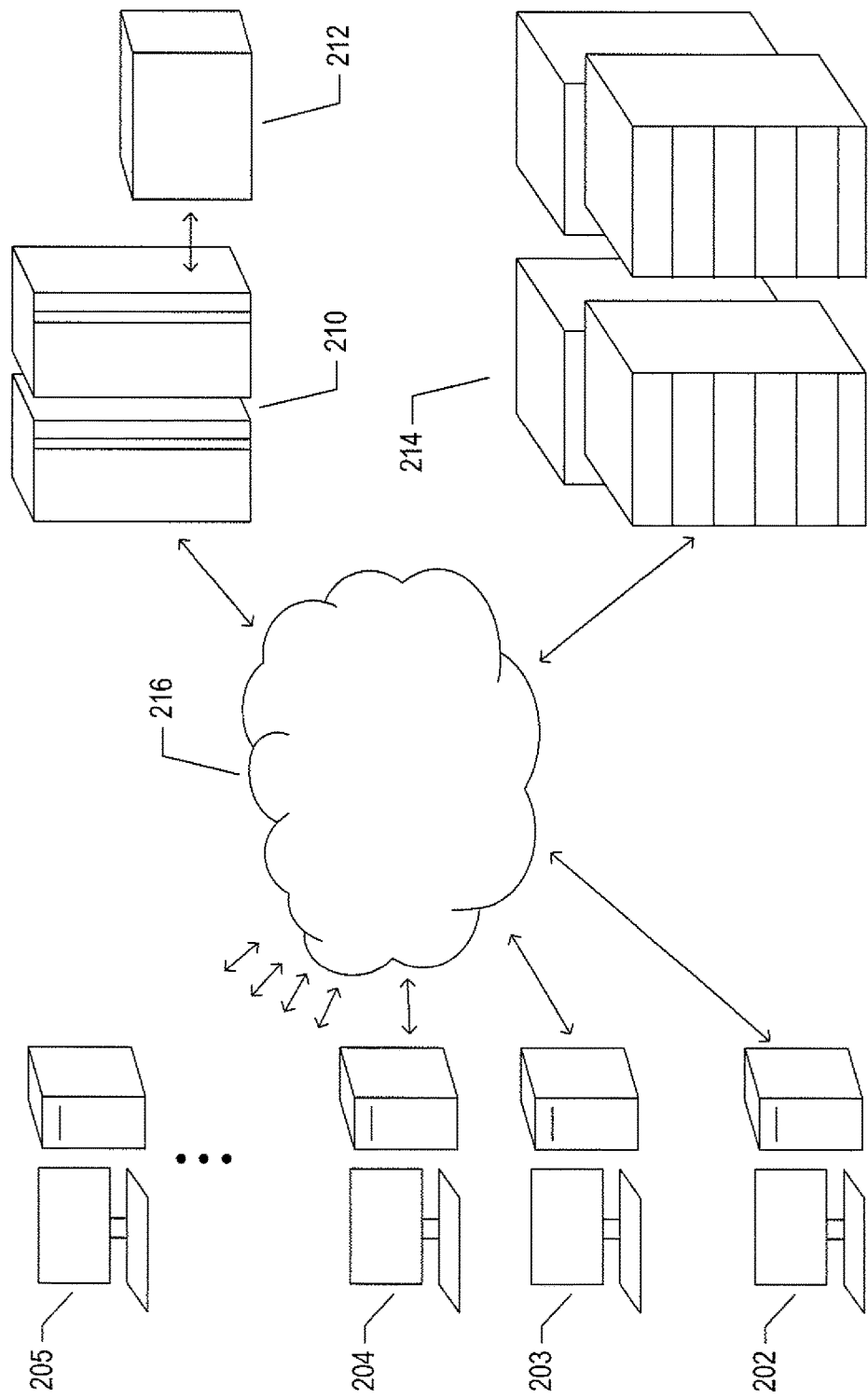
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
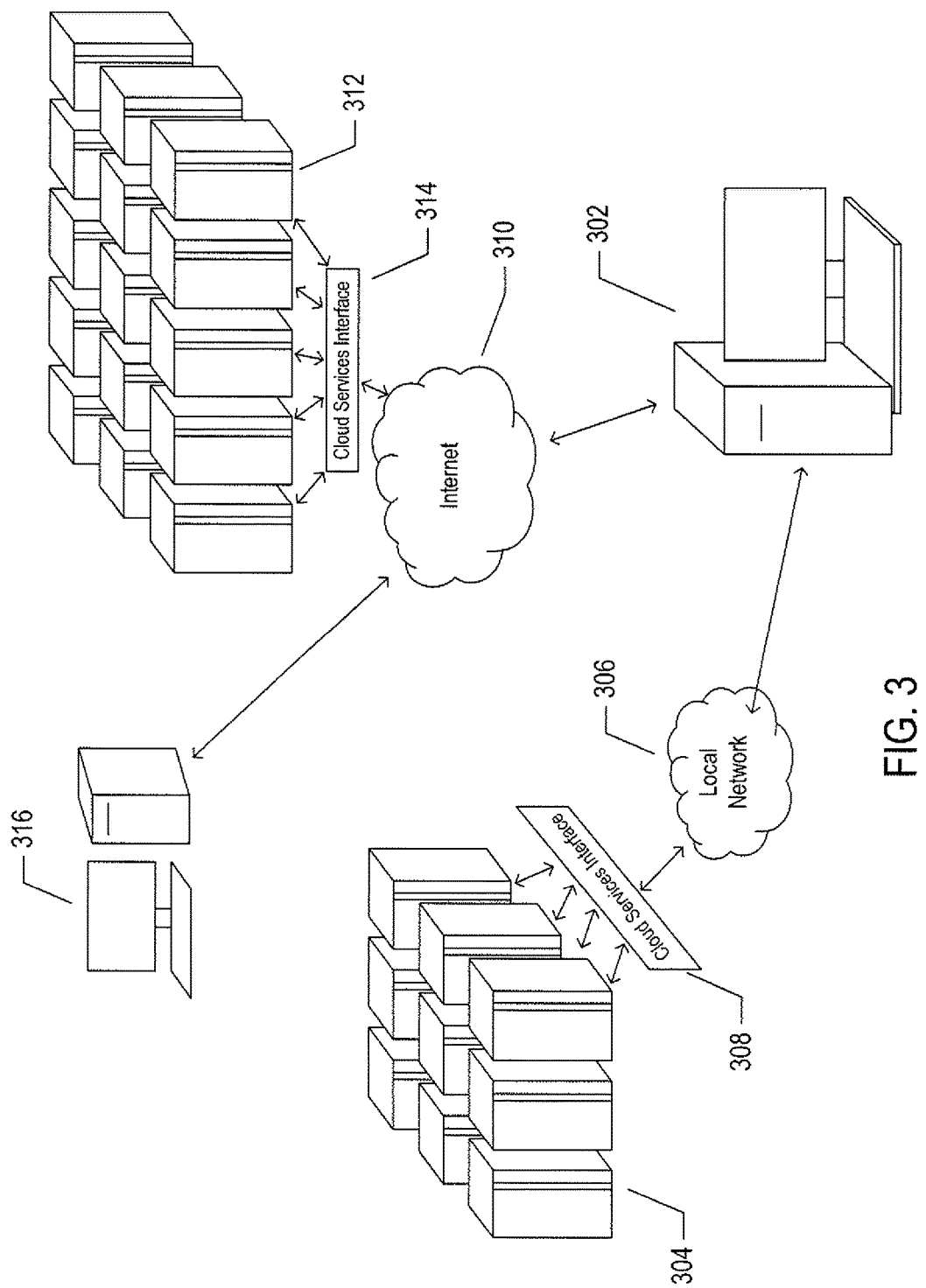
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
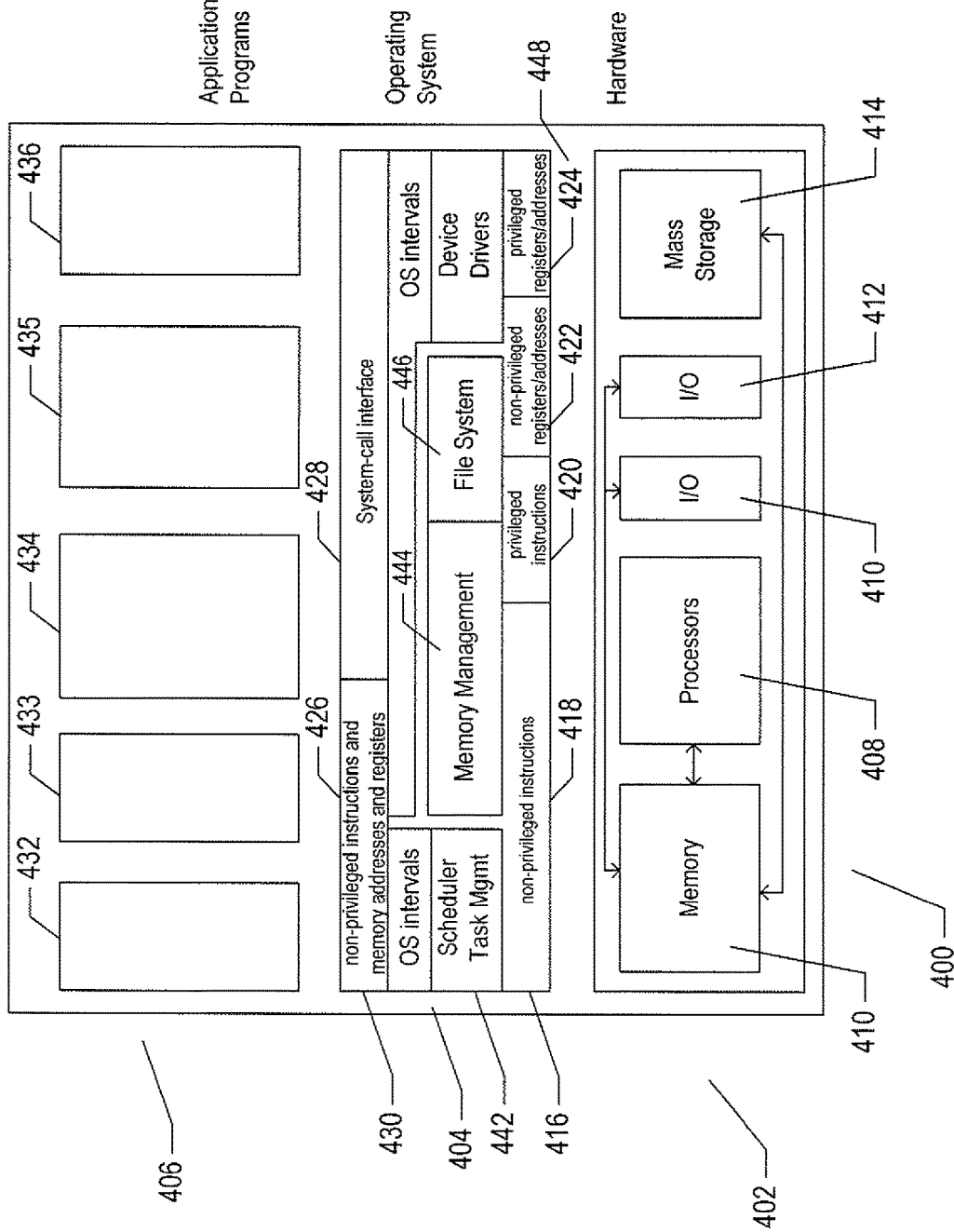
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
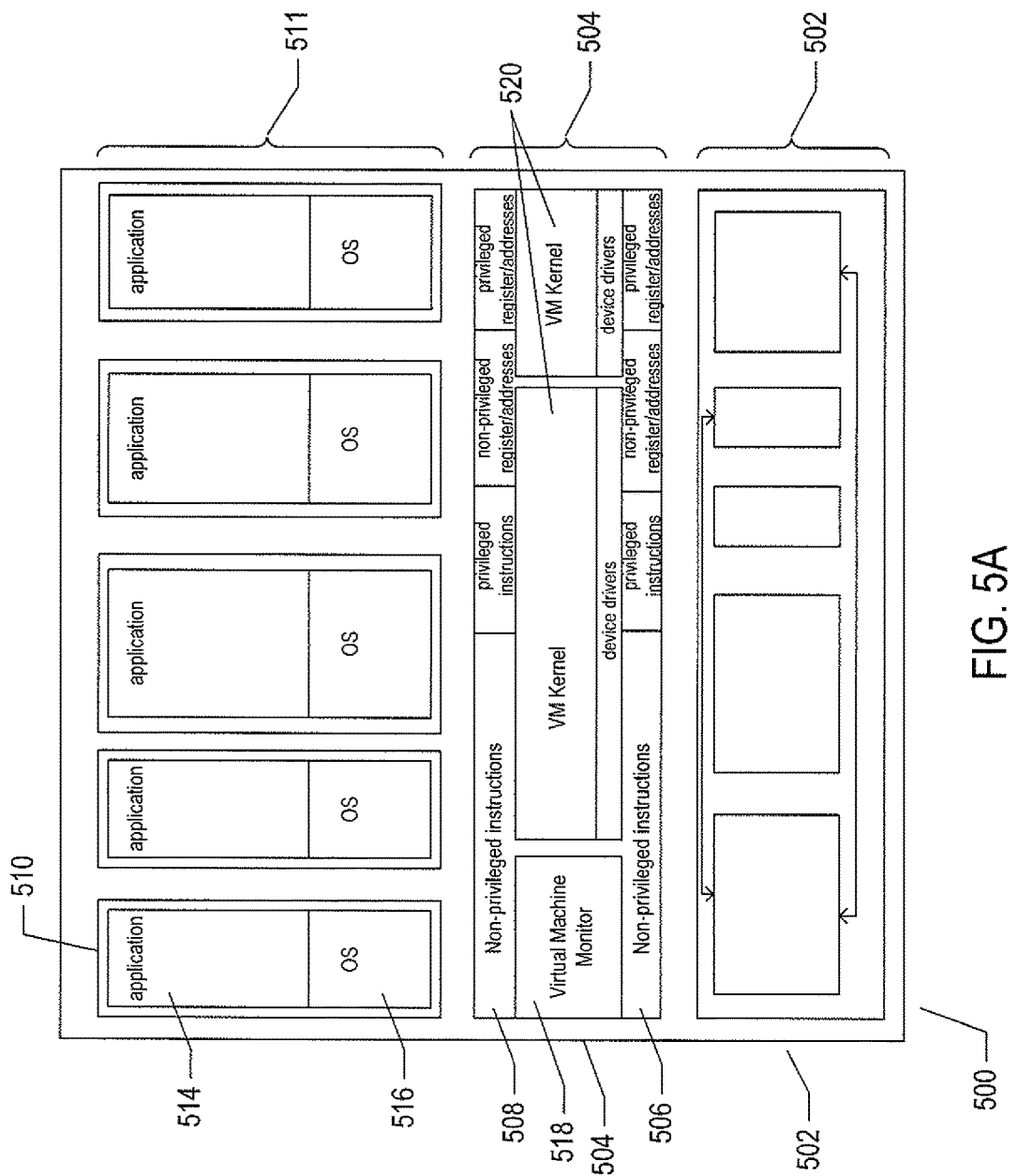

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4.

Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
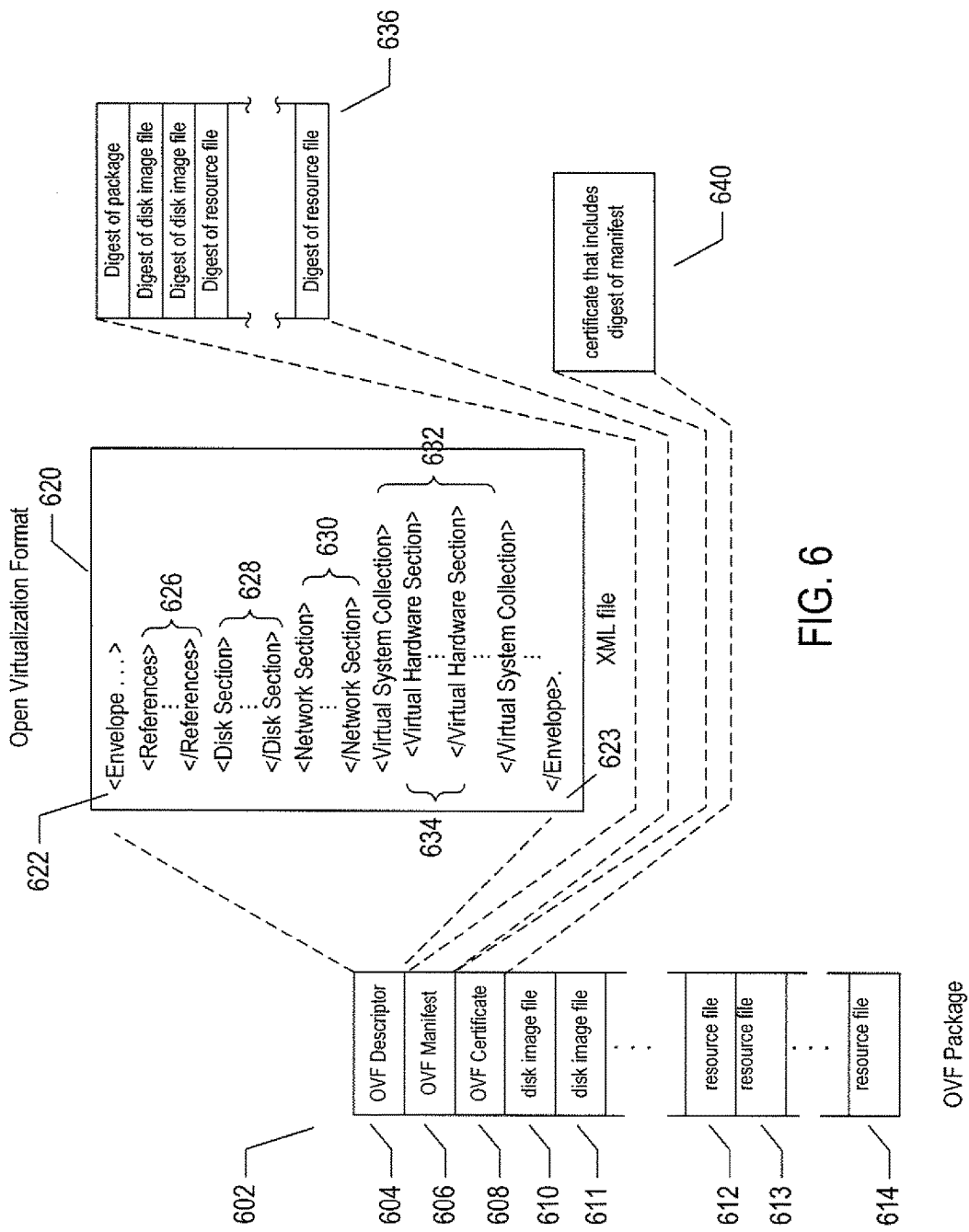
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
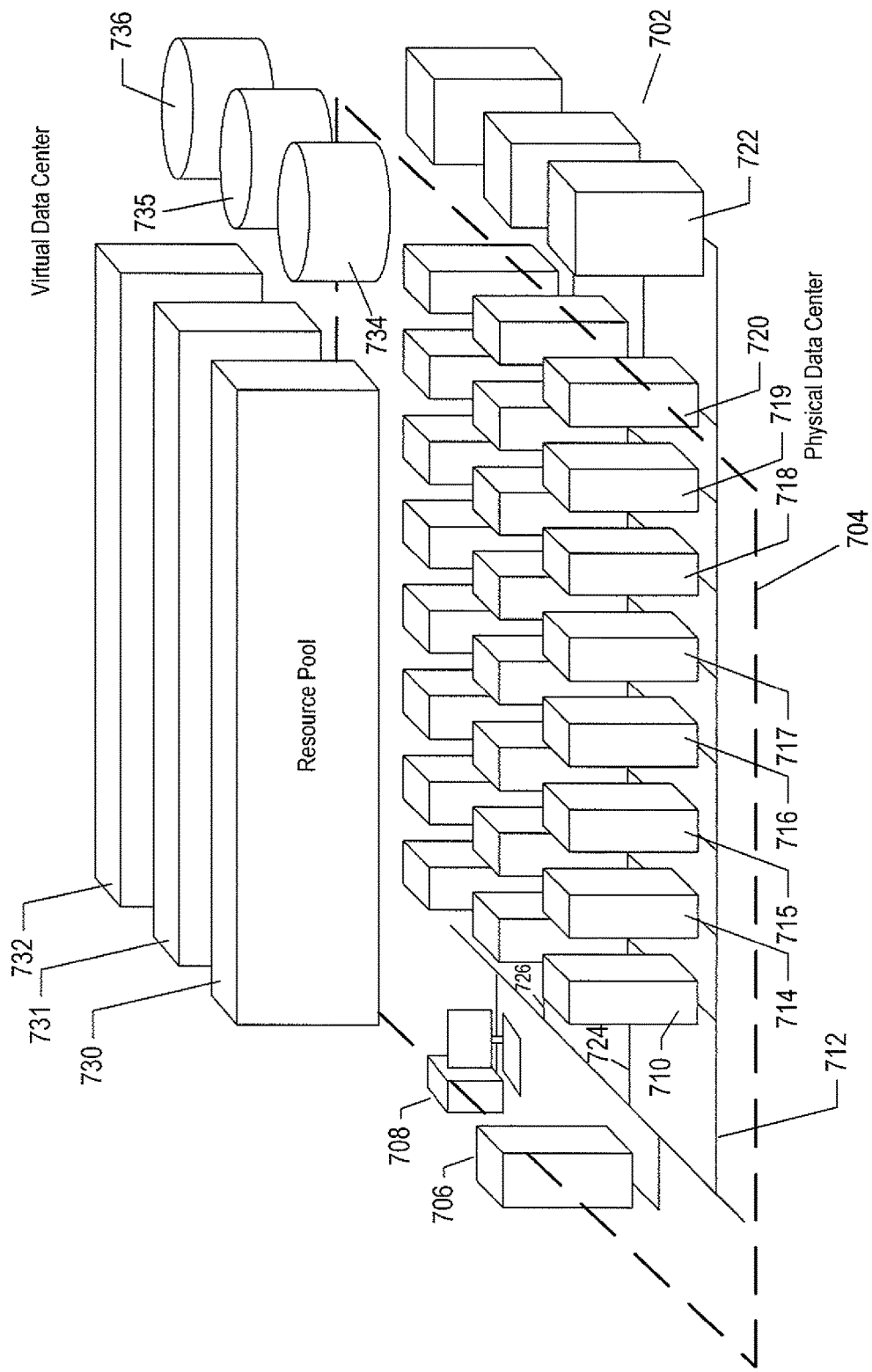
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
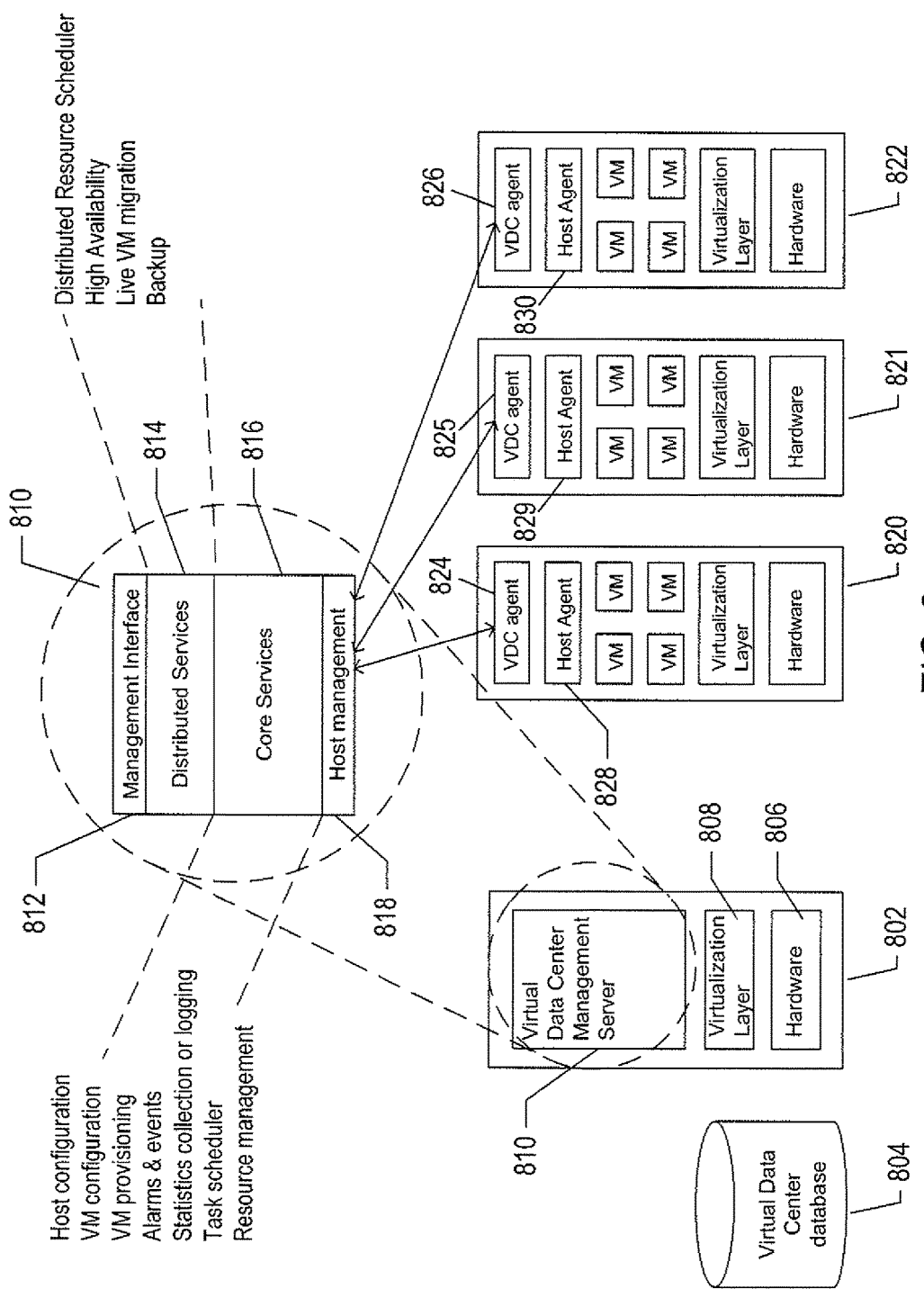
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server VM 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
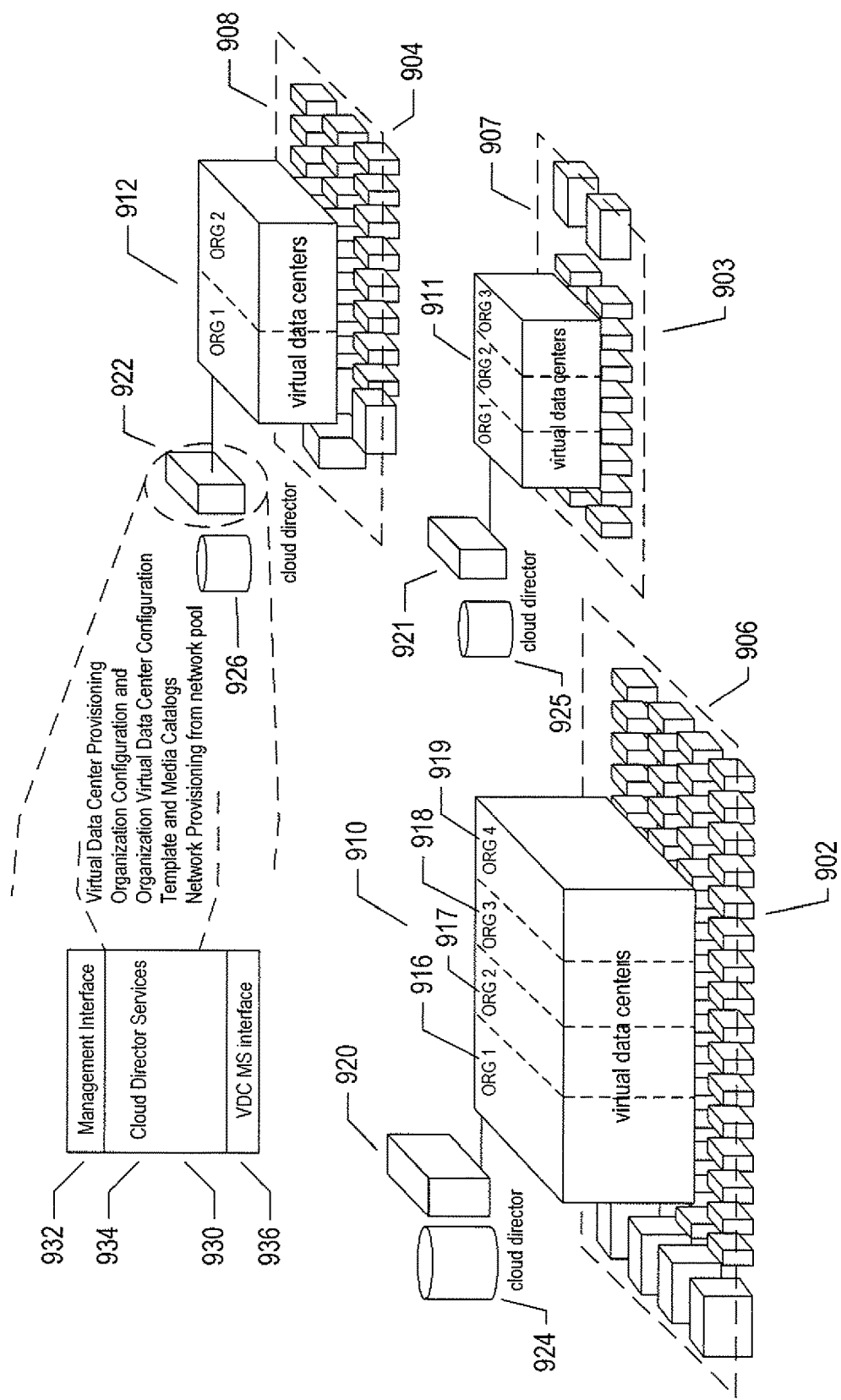
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
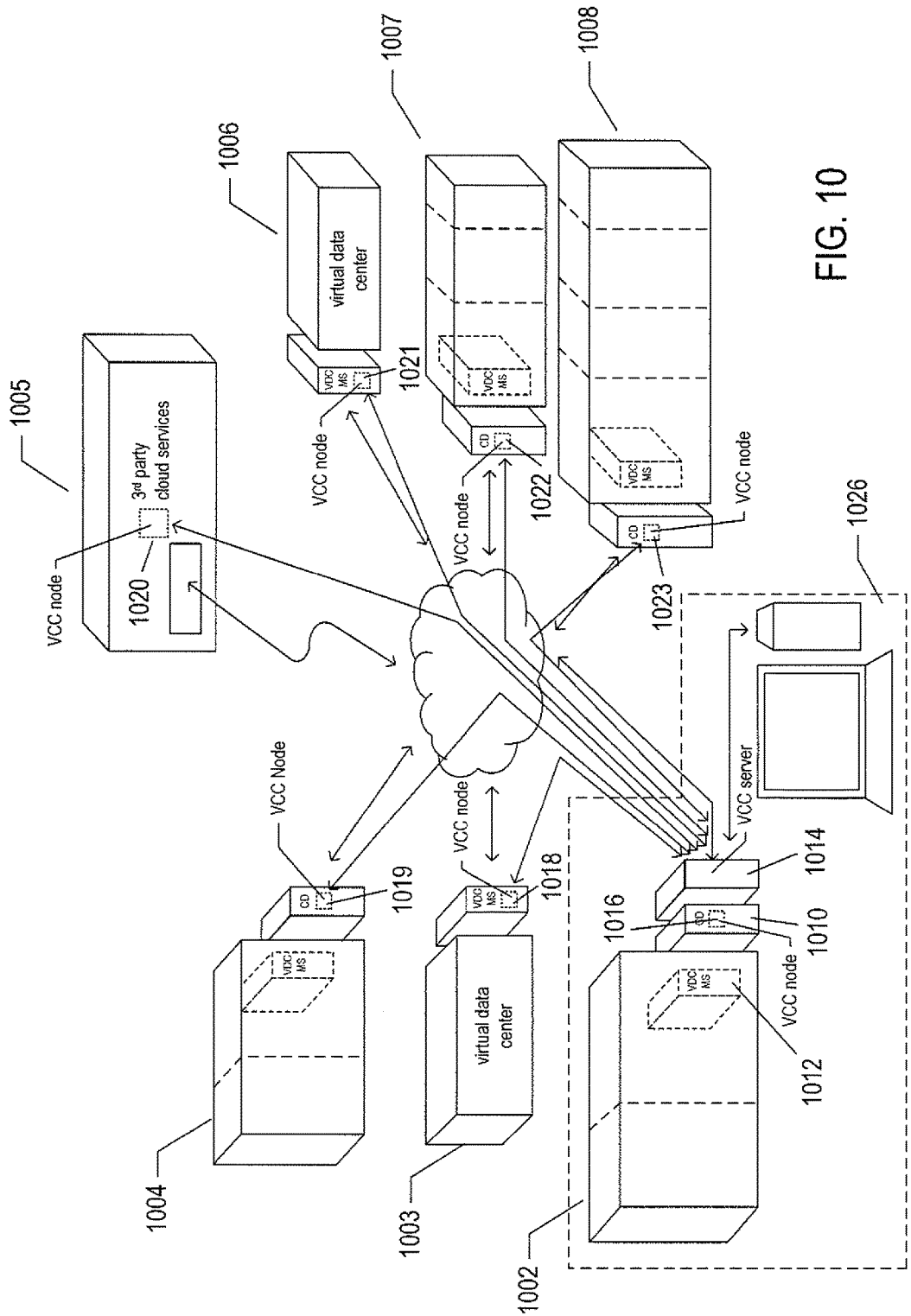
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
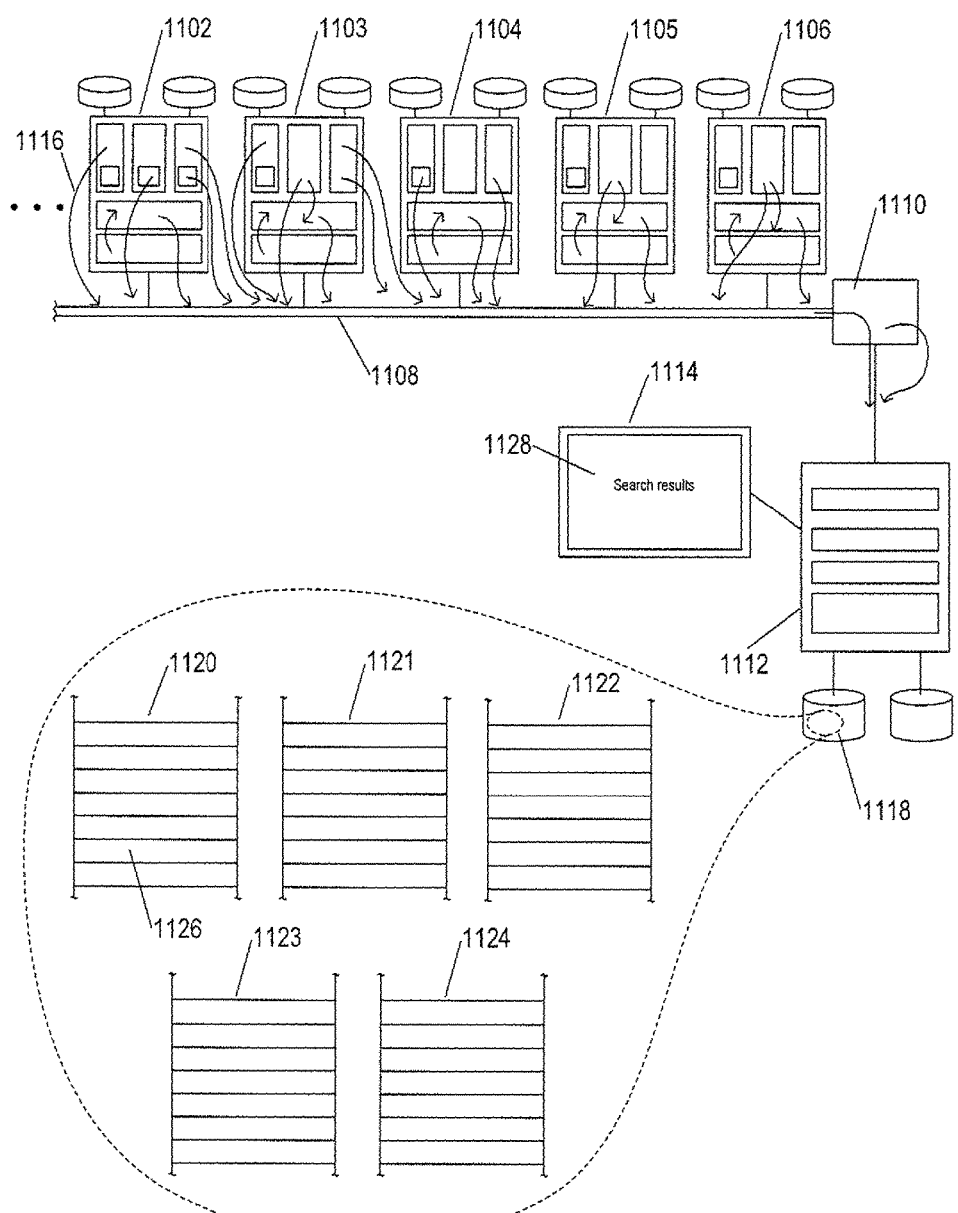
FIG. 11 shows an example of logging event messages in event-log files.

Methods and Systems to Narrow a Search for Potential Sources of Problems in a Distributed Computing System FIG. 11 shows an example of logging event messages in event-log files. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102-1106 as well as the communications bridge/router 1110 generate event messages that are transmitted to the administration computer 1112. Event messages may be generated by application programs, operating systems, VMs, guest operating systems, and other computer programs running on the computer systems 1102-1106 and the bridge/router 1110. Event messages may be relatively directly transmitted from a component within a discrete computer system to the administration computer 1112 or may be collected at various hierarchical levels within a discrete computer system and then forwarded from an event-message-collecting entity within the discrete computer system to the administration computer 1112. The administration computer 1112 collects and stores the received event messages in a data-storage device or appliance 1118 as event-log files 1120-1124. Rectangles, such as rectangle 1126, represent individual event messages. For example, event-log file 1120 may comprise a list of event messages generated within the computer system 1102. Methods described below enable an administrator, or other user, to display 1128 search results of a limited search for potential sources of problems in the distributed computing system based on volatility of certain types of event messages.

Figure 12:
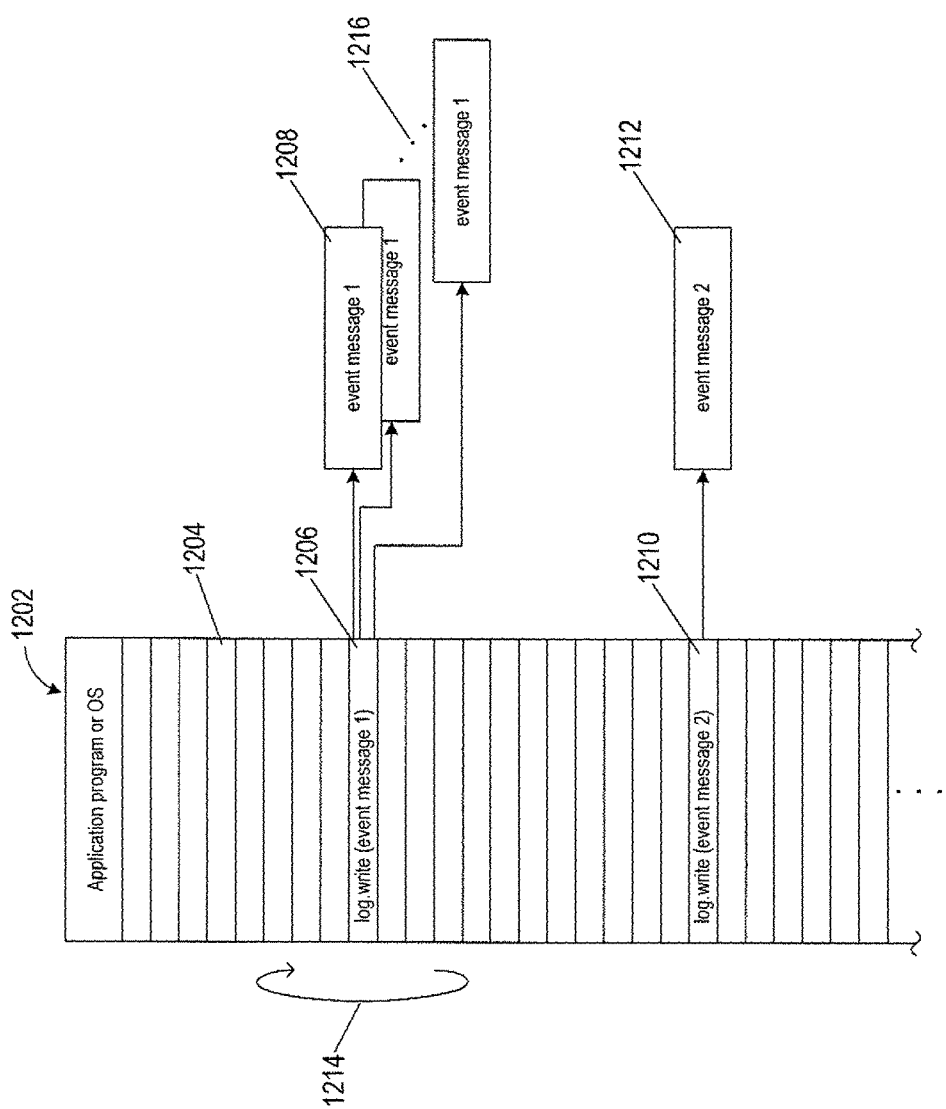
FIG. 12 shows an example of a source code with log write instructions.

FIG. 12 shows an example of a source code 1202 of an application program, an operating system, a VM, a guest operating system, or any other computer program or machine code. Rectangles, such as rectangle 1204, represent a definition, a comment, a statement, or a computer instruction that expresses some action to be executed by a computer. The source code 1202 includes log write instructions that generate event messages when certain events predetermined by the developer occur during execution of the source code 1202. For example, source code 1202 includes an example log write instruction 1206 that when executed generates an event message 1 represented by rectangle 1208, and a second example log write instruction 1210 that when executed generates event message 2 represented by rectangle 1212. In the example of FIG. 2, the log write instruction 1206 is embedded within a set of computer instructions that are repeatedly executed in a loop 1214. As shown in FIG. 2, the same event message 1 is repeatedly generated 1216. The same type of log write instructions may also be located in different places throughout the source code, which in turn may create repeats of essentially the same type of event message in the event-log file.

Note that the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event-log file to which the event message is written. Log write instructions may be written in a source code by the developer of an application program or operating system in order to record events that occur while an operating system or application program is running as event messages. For example, a developer may include log write instructions that are executed when certain events occur, such as failures, logins, or errors.

FIG. 13 shows an example of a log write instruction 1302. In the example of FIG. 13, the log write instruction 1302 includes arguments identified with "$." For example, the log write instruction 1302 includes a time-stamp argument 1304, a thread number argument 1305, and an internet protocol ("IP") address argument 1306. The example log write instruction 1302 also includes text strings and natural-language words and phrases that identify the type of event that triggered the log write instruction, such as "Repair session" 1308. The text strings between brackets "[ ]" represent file-system paths, such as path 1310. When the log write instruction 1302 is executed, parametric values are assigned to the arguments and the text strings and natural-language words and phrases are stored as an event message in an event-log file.

FIG. 14 shows an example of an event message 1402 generated by the log write instruction 1302. The arguments of the log write instruction 1302 are assigned numerical parameters that are recorded in the event message 1402 at the time the event message is written to the event-log file. For example, the time stamp 1304, thread 1305, and IP address 1306 of the log write instruction 1302 are assigned corresponding numerical parameters 1404-1406 in the event message 1402. The time stamp 1404, in particular, represents the date and time the event message is generated. The text strings and natural-language words and phrases of the log write instruction 1302 also appear unchanged in the event message 1402 and may be used to identify the type of event that occurred during execution of the application program or operating system.

Figure 15:
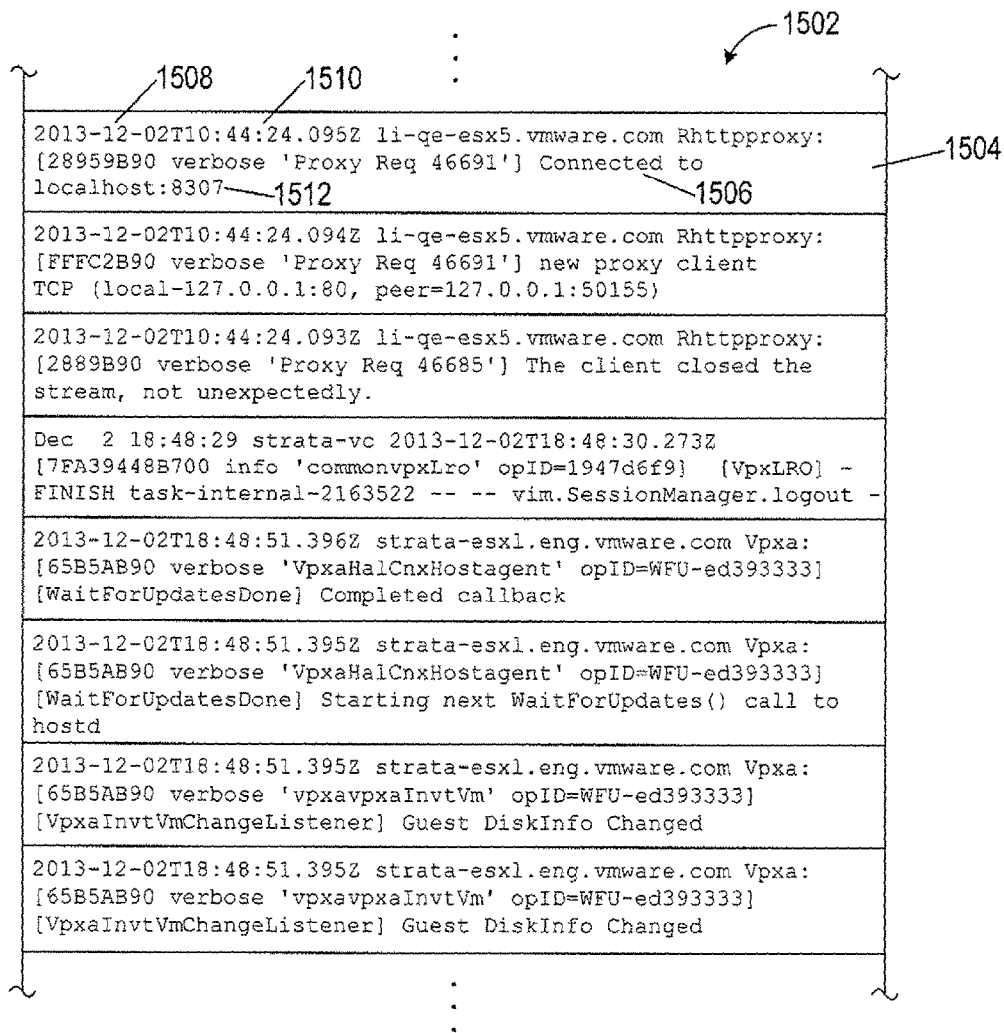
FIG. 15 shows a small, eight-entry portion of an event-log file.

As event messages are received at the administration computer 1112, the event messages are stored in event-log files in the order in which the event messages are received. FIG. 15 shows a small, eight-entry portion of an event-log file 1502. In FIG. 15, each rectangular cell, such as rectangular cell 1504, of the portion of the event-log file 1502 represents a single stored event message. For example, event message 1502 includes a short natural-language phrase 1506, date 1508 and time 1510 numerical parameters, as well as, a numerical parameter 1512 that appears to identify a particular host computer.

The text strings and natural-language words and phrases of each event message describe a particular type of event called an "event type." For example, the text strings and natural-language words and phrases, called "non-parametric tokens," of the event message 1402 shown in FIG. 14 identify the event type. As explained above, each time the log write instruction 1302 of FIG. 13 is executed, only the parameter values are changed, such as the time and date. The non-variable text strings and natural-language words and phrases (i.e., non-parametric tokens) are the same for each event message generated by the log write instruction 1302 and stored in the event-log file. Event-type analysis may be used to identify the event type of each event message based on the non-parametric tokens, and event messages of the same event type may be counted. A record of the different event types and number of each event type may be recorded in an event-type log file.

Figure 16:
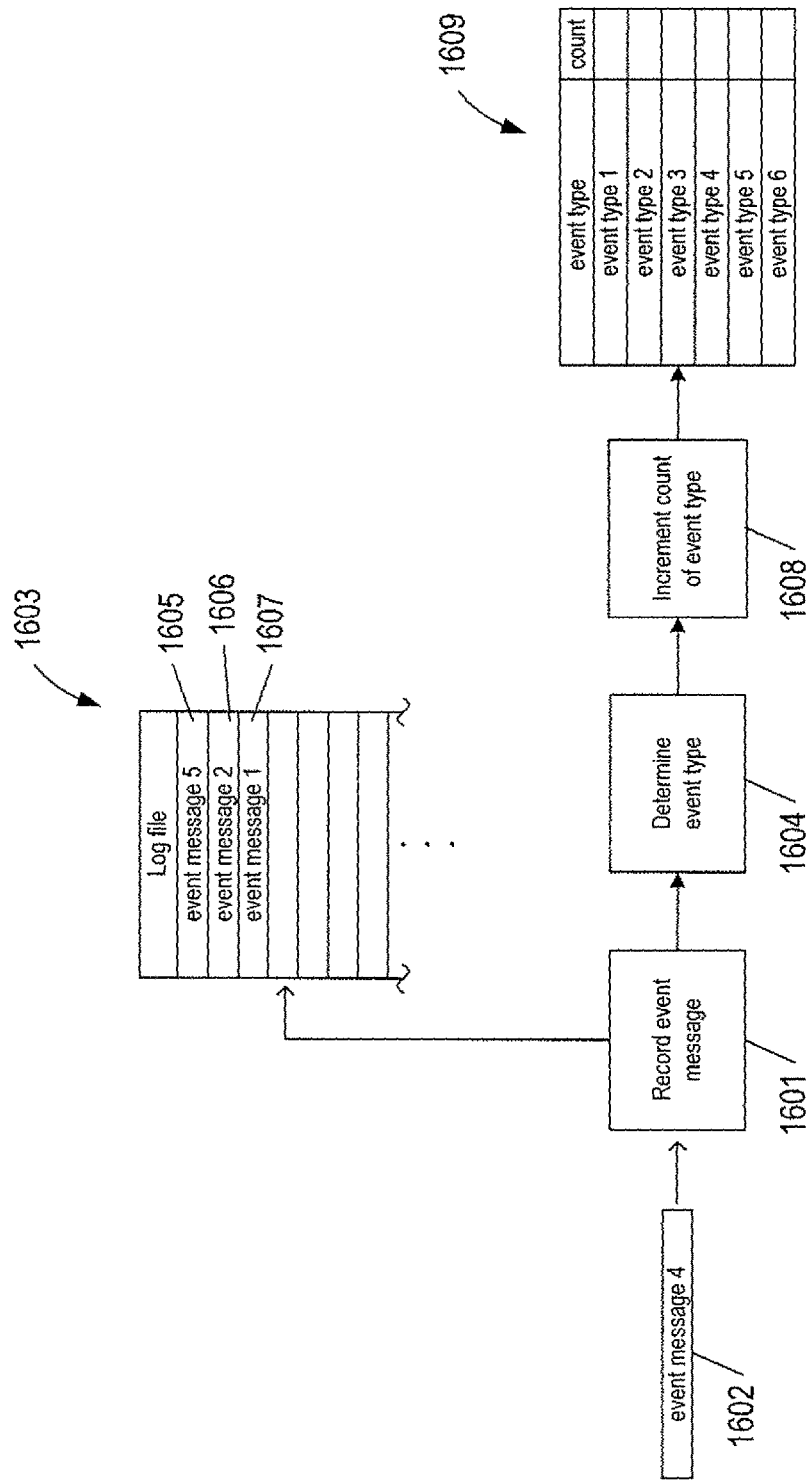
FIG. 16 shows an example of handling event messages as the event messages are received.

FIG. 16 shows an example of handling event messages as the event messages are received at the administration computer system 1112. In block 1601, event messages, such as event message 1602, are recorded in an event-log file 1603. In block 1604, each event message is subject to event-type analysis in order to determine the event type of the event message. Event-type analysis determines the non-parametric tokens of each event message. Event messages having the same non-parametric tokens may be regarded as being of the same event type. For example, event message 5 1605 belongs to an event type denoted by "event type 5," event message 2 1606 belongs to an event type denoted by "event message 2," and event 1607 belongs to an event type denoted by "event message 1." In block 1608, the count of each event type is incremented. The event types and associated counts of each event type are recorded in an event-type log 1609.

Figure 17A:
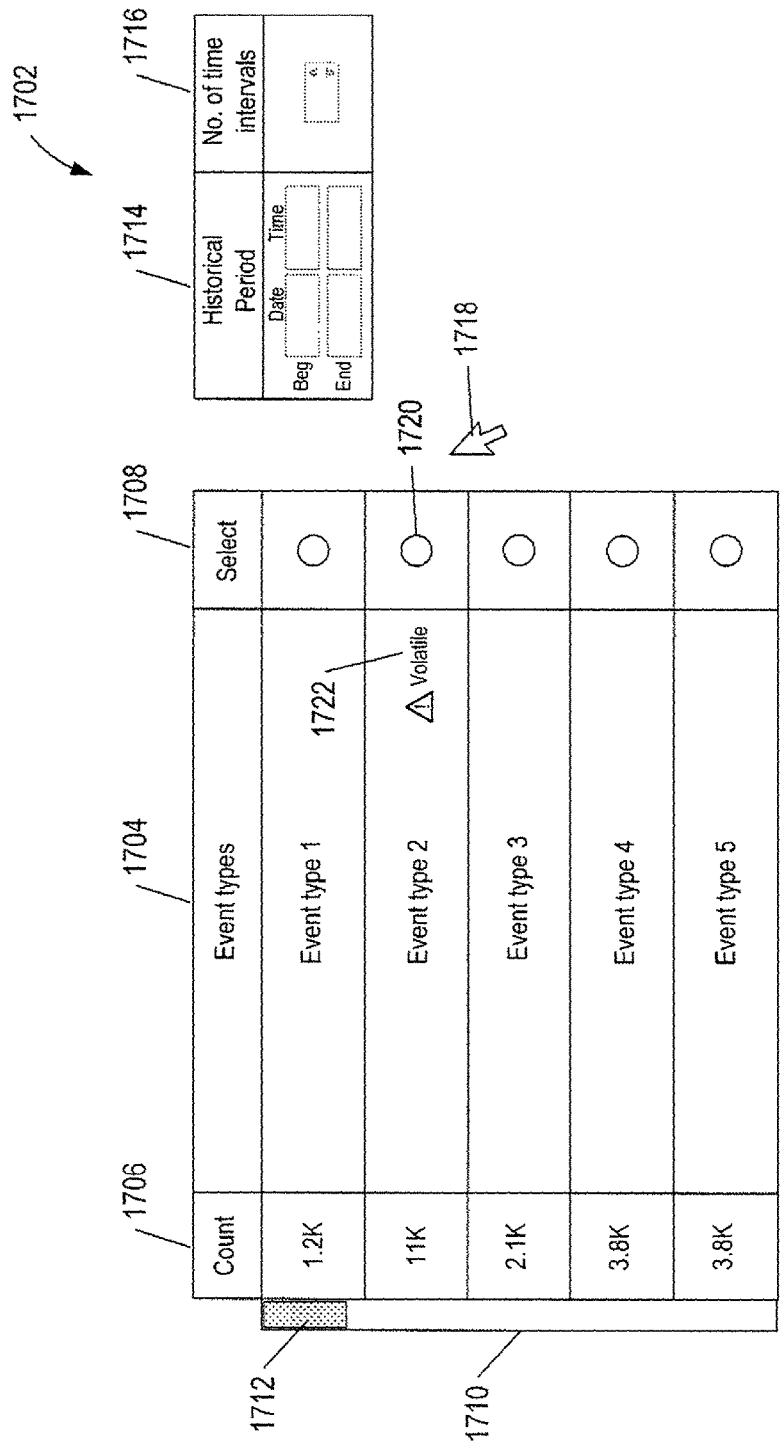
FIG. 17A shows an example of a graphical-user interface ("GUI") that list the event types and associated counts of an event-log file collected within an observation time window.
Figure 17B:
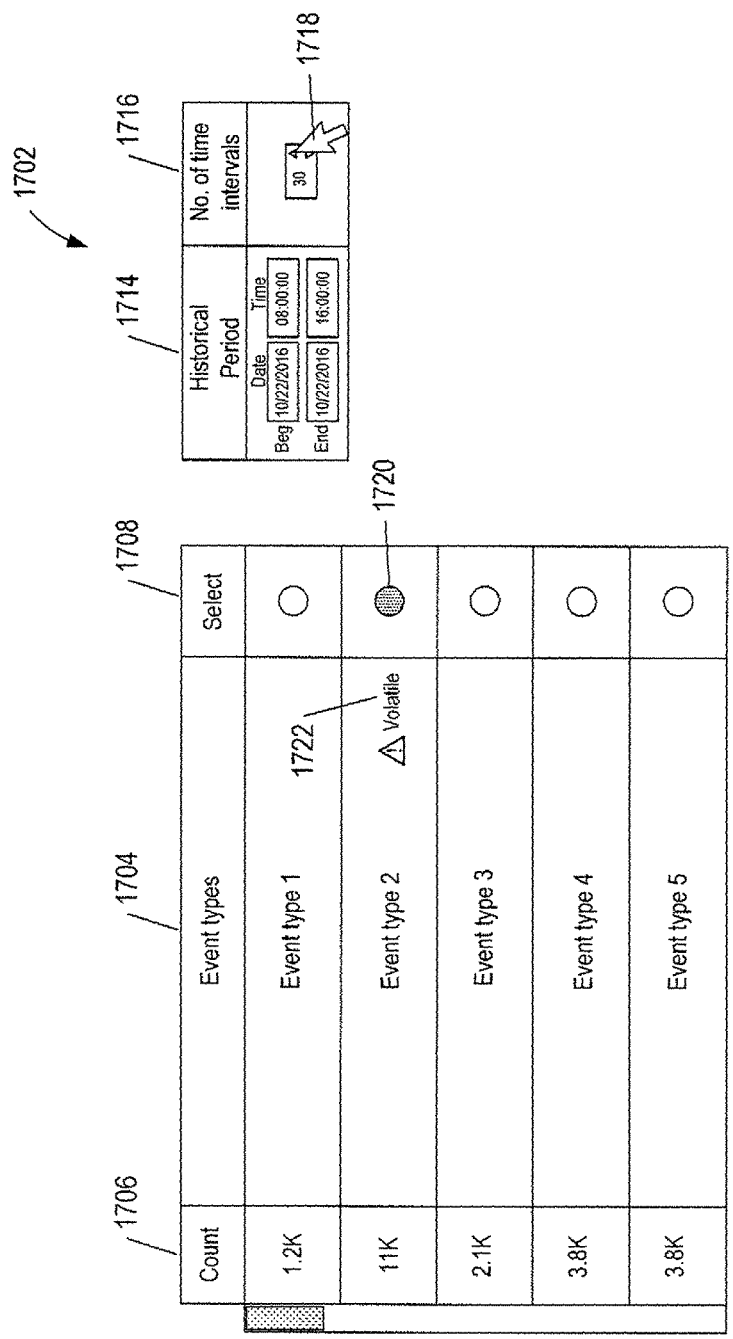
FIG. 17B shows the GUI with an event type selected for further investigation.

The event types and associated counts may be displayed in a graphical user interface ("GUI") that enables a user to identify a volatile event type. FIG. 17A shows an example of a GUI 1702 that list the event types and count of each event type collected with an observation time window. Column 1704 list each the event types. Column 1706 lists the associated count of each event type recorded in the observation time window. The GUI 1702 includes a column 1708 that enables each event type to be selected for further investigation. The GUI 1702 includes a scrollbar 1710 and bar 1712 that enables a user to scroll up and down through the list of event types and associated counts in an effort to identify one or more potential volatile event types. A volatile event type is an event type that has suddenly or unexpectedly increased in frequency relative to the frequency of other event types generated over the observation time window. The GUI 1702 includes a field 1714 for entering beginning and ending time limits of a historical period of time and a field 1716 for entering a number of time intervals the historical period of time is to be partitioned into. The historical period of time is the time period in which a search is conducted to identify one or more potential sources of the volatile event type. When an event type has been selected for further investigation in column 1708 by clicking on an open circle, such as open circle 1720, with a cursor 1718, the fields of the historical period 1714 and the number of time intervals 1716 are activated. FIG. 17B shows the GUI 1702 with the event type "event type 2" selected for further investigation as indicated by shaded circle 1720. Fields are for the historical period of time 1714 and number of time intervals 1716 are filled.

In certain implementations, volatile event types may be identified with a warning 1722 in order to aid a user in deciding which of the event types may be a volatile event type to investigate. The warning may be generated based on the fraction or percentage of each event type generated over the observation time window. Let $\{ET_1^{count}, \ldots, ET_n^{count}, \ldots, ET_N^{count}\}$ be a set of event-type counts of N different event types generated within the observation time window, where subscript n is an event type index, $n=1, \ldots, N$, and $ET_n^{count}$ is the event-type count or number of times an "event type n" is generated within the observation time window. The fraction of each event type generated within the observation time window may be calculated as follows:

$$F(n) = \frac{ET_n^{count}}{ET_{TOT}^{count}} \tag{1a}$$

where the sum of the event-type counts is given by $$ET_{TOT}^{count} = \sum_{n=1}^{N} ET_n^{count} \tag{1b}$$

When the fraction of an event type satisfies the following condition:

$$F(n) > Th_{ET} \tag{2}$$

where $Th_{ET}$ is a volatility threshold with a value between zero and one, a warning may be displayed in the GUI 1702 next to, or within, the field of the event type in order to aid the user in identifying which of the event types may be a volatile event type. In the example of FIGS. 17A-17B, the fraction F(2) of the "event type 2" is greater than $Th_{ET}$. As a result, the warning "Volatile" 1722 is displayed within the field of the "event type 2."

Figure 18:
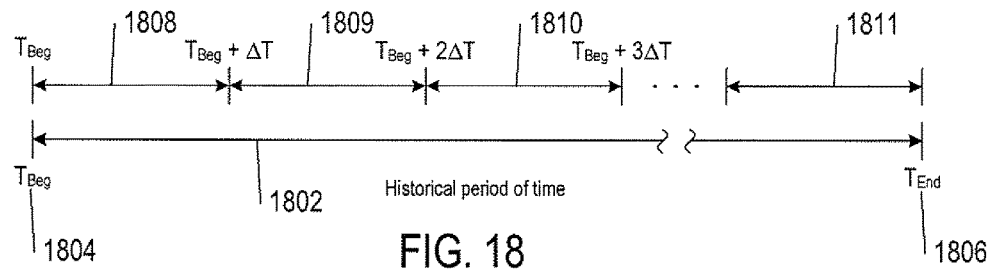
FIG. 18 shows an example of a historical period of time partitioned in time intervals.

After the event type has been selected and values for the historical period of time and number of time intervals have been entered as described above with reference to FIG. 17B, the historical period of time is partitioned into time internals according to the number of selected time intervals. FIG. 18 shows an example of a historical period of time represented by a horizontal line 1802. The beginning time 1804 of the historical period is denoted by $T_{Beg}$. The end time 1806 of the historical period is denoted by $T_{End}$. The historical period is partitioned into time intervals of approximately equal duration $\Delta T$, where $\Delta T = (T_{End} - T_{Beg})/M$ and M is the number of time intervals. The time intervals are represented by line segments 1808-1811.

Figure 19:
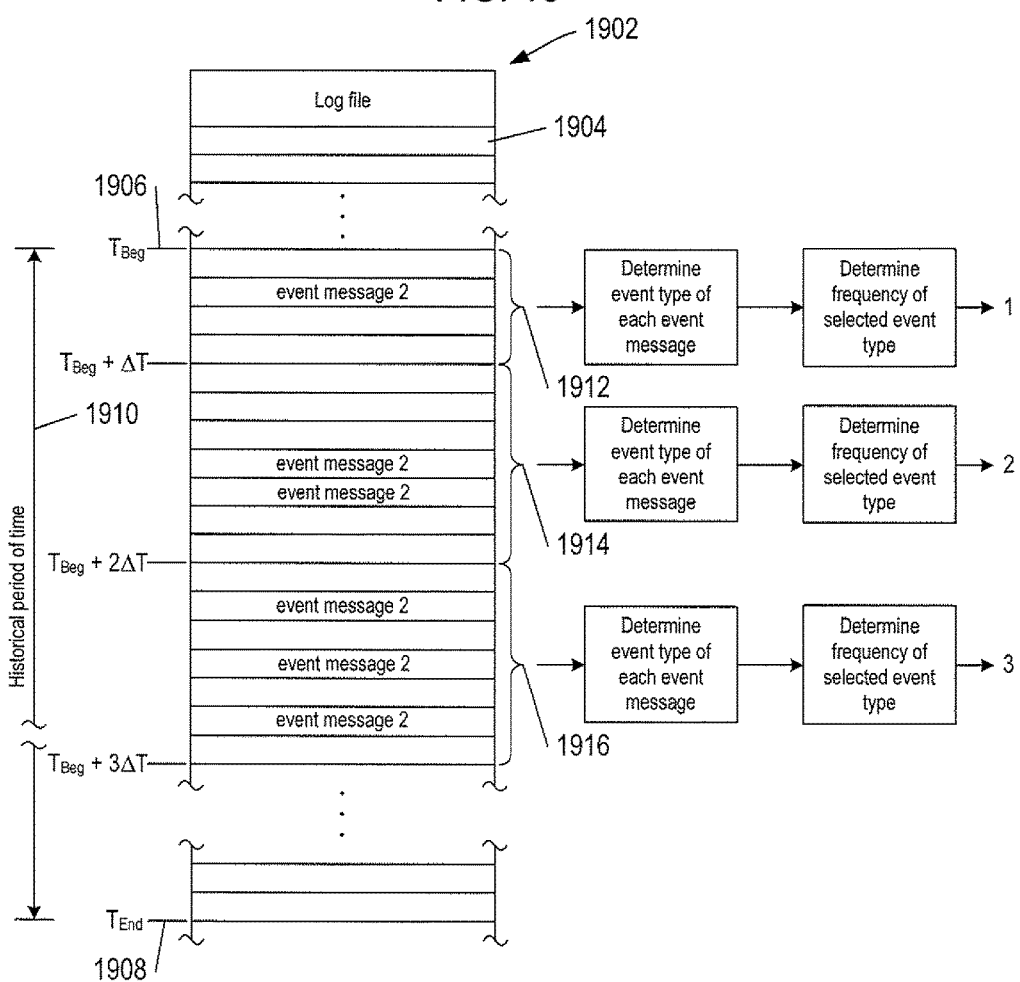
FIG. 19 shows an example of counting event messages with the same event type as a selected event type in time intervals of a historical period of time.

FIG. 19 shows an example of determining a frequency of event messages of an event-log file 1902 with a selected event type in time intervals of a historical period of time. Event messages are represented by rectangles, such as rectangle 1904. Lines 1906 and 1908 mark the beginning and ending times, $T_{Beg}$ and $T_{End}$, of the historical period of time 1910. Event messages with time stamps in a time interval $[T_{Beg}+(m-1)\Delta T, T_{Beg}+m\Delta T]$, where m=1, ..., M, are subjected to event-type analysis in order to determine the event type of each event message 1912. Event messages with the same event type as the selected event type are counted to give the frequency of the selected event type in the time interval $[T_{Beg}+(m-1)\Delta T, T_{Beg}+m\Delta T]$. In the example of FIG. 19, selected "event type 2" event messages of the event-log file 1902 are denoted by "event message 2." A set of event messages 1912 with time stamps in the time interval $[T_{Beg}, T_{Beg}+\Delta T]$ are subjected to event-type analysis in order to determine the event type of each event message in the set of event messages 1912. Event messages with the same event type as selected "event type 2" are counted to give a frequency of "1" for the "event type 2" in the time interval $[T_{Beg}, T_{Beg}+\Delta T]$. The frequency of "event type 2" event messages in the set of event messages 1914 with time stamps in the time interval $[T_{Beg}+\Delta T, T_{Beg}+2\Delta T]$ is "2." The frequency of "event type 2" event messages in the set of event messages 1916 with time stamps in the time interval $[T_{Beg}+2\Delta T, T_{Beg}+3\Delta T]$ is "3."

Figure 20:
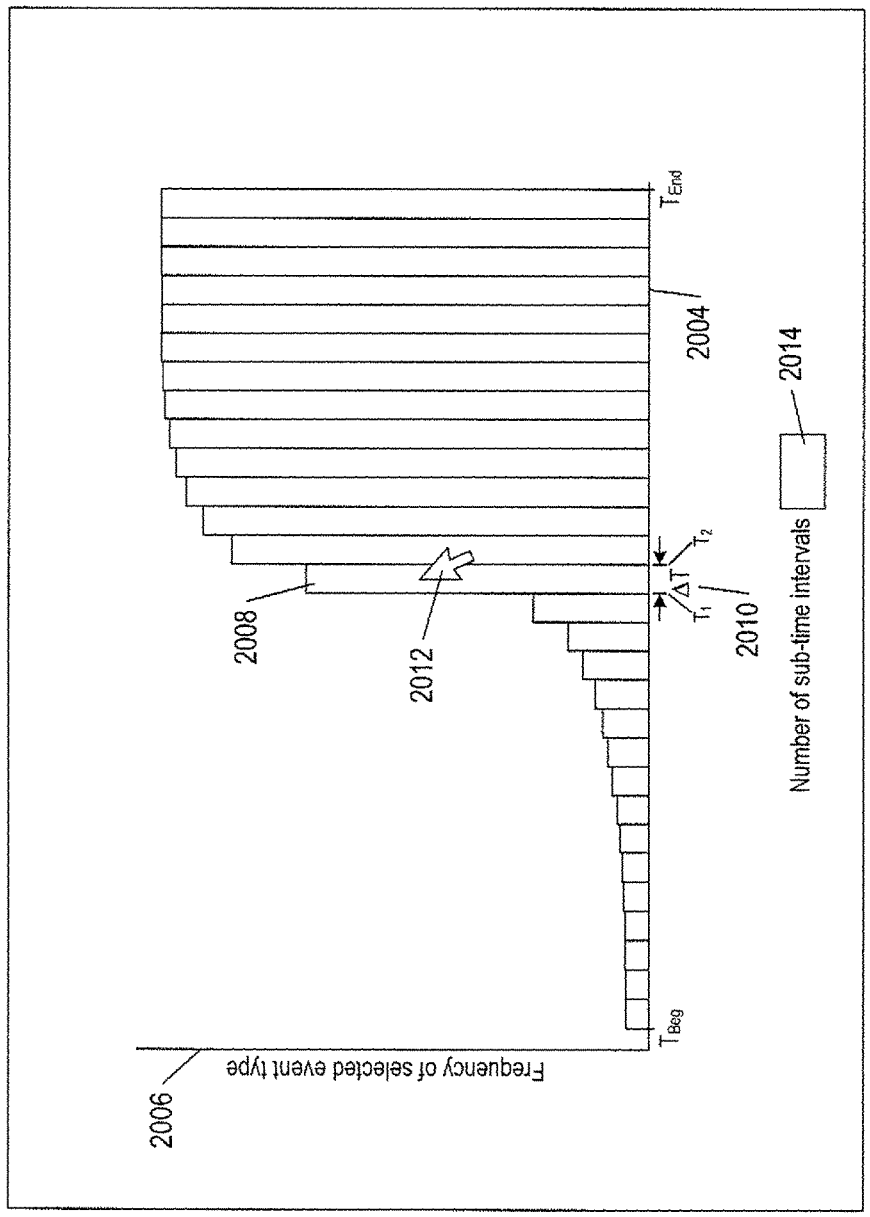
FIG. 20 shows an example of a GUI of frequencies of event messages that match a selected event type as a bar graph.

The frequencies of event messages that match the selected event type may be displayed in a GUI. FIG. 20 shows an example of GUI display of frequencies of event messages that match a selected event type. Horizontal axis 2004 represents time. Vertical axis 2006 represents frequency of selected event type. Bars represent the frequency of event messages with the same event types as the selected event type generated within a time interval of the historical period of time determined as described above with reference to FIG. 19. For example, bar 2008 represents the frequency of event messages with an event type that matches the event type of the selected even type generated within a time interval $[T_1, T_2]$ 2010, where $T_2 = T_1 + \Delta T$. The GUI 2002 enables a user to click on a bar in order to reveal the number of event messages generated within sub-time intervals of the time interval associated with the bar. For example, the bar 2008 represents the greatest increase in event messages of the time intervals and may be a place to begin searching for a problem. When a user clicks on the bar 2008 using cursor 2012, a separate window is displayed to reveal the number of event messages generated within sub-time intervals of the time interval $[T_1, T_2]$ 2010. The user may input a selected number of sub-time intervals in field 2014.

Figure 21:
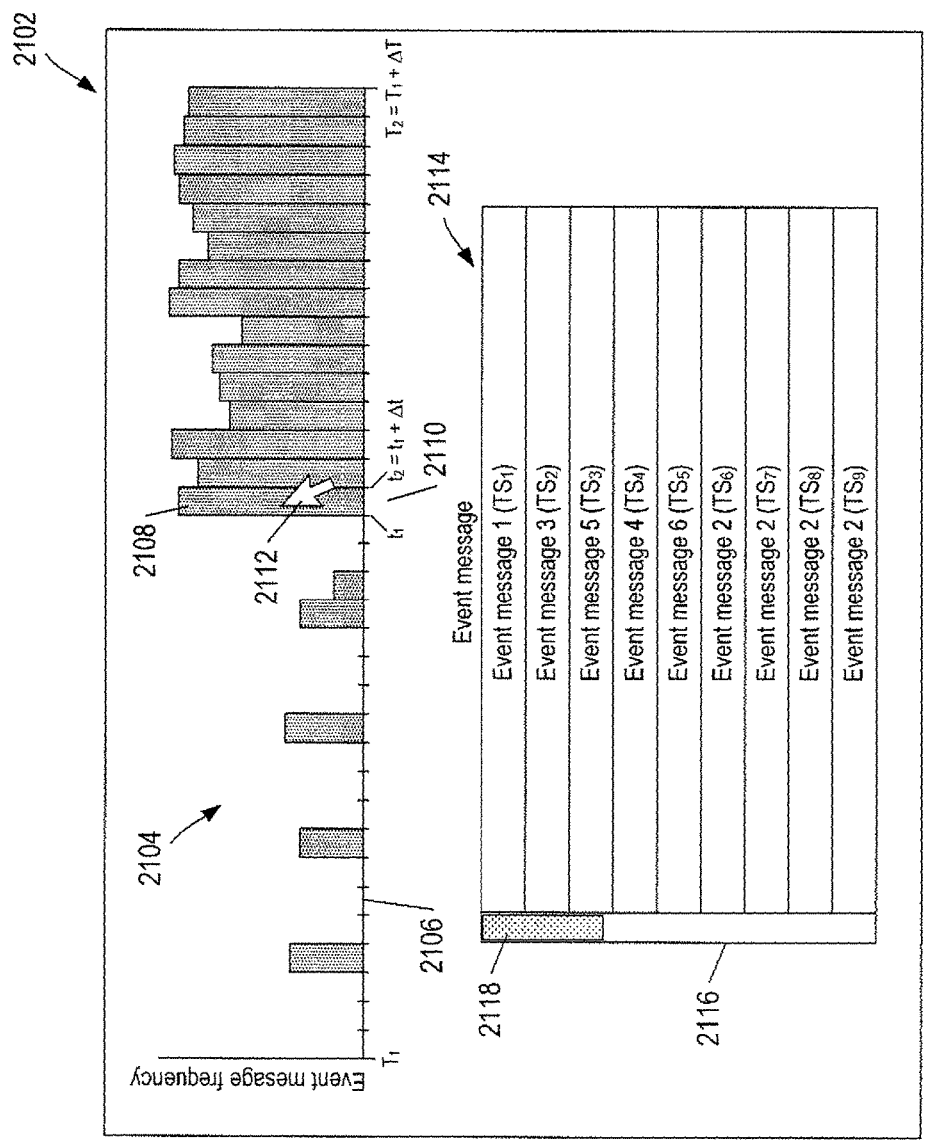
FIG. 21 shows a GUI of event messages frequencies in sub-time intervals as a bar graph.

FIG. 21 shows a GUI 2102 that displays a bar graph 2104 of frequencies of event messages generated in sub-time intervals of a selected time window. Horizontal axis 2106 represents an expansion of the time interval $[T_1, T_2]$ 2010 shown in FIG. 20. Vertical axis 2108 represents event message frequency of the event messages. The selected time interval is partitioned into sub-time intervals of duration $\Delta t$. The duration of the sub-time intervals may be determined by $\Delta t = (T_2 - T_1)/K$, where K represents a number of user selected number of sub-time intervals of the time interval $[T_1, T_2]$ 2010. The event-log file is searched for event messages generated within each of the sub-time intervals. The event messages with time stamps that lie with a sub-time interval are counted and displayed as a shaded bar in the bar graph 2104. For example, shaded bar 2108 represents the total number of event messages generated with time stamps in the selected sub-time interval $[t_1, t_2]$ 2110. A user may investigate the event messages generated within a sub-time interval by clicking on a shaded bar of the bar graph 2104. For example, when a user clicks on shaded bar 2108 using a cursor 2112, a window 2114 that list the event messages generated within the sub-time interval 2110 is displayed. The window 2114 includes a scrollbar 2116 and bar 2118 that enables a user to scroll through different types of event messages. In the example of FIG. 21, the time stamps of the event messages displayed in the window 2114 include time stamps denoted by $TS_j$, where the subscript j is a positive integer index and the time stamps satisfy the condition $t_1 < TS_j < t_2$. The user may scroll through the event messages to try and identify an event message that may indicate the cause of the increased frequency of the "event message 2." In other implementations, the event-type analysis may be applied to each of the event messages in a selected to sub-time interval in order to identify any event types that are indications of problems, such as Errors or Failures. For example, certain event types may be generated when a particular type of error or failure occurs.

Figure 22A:
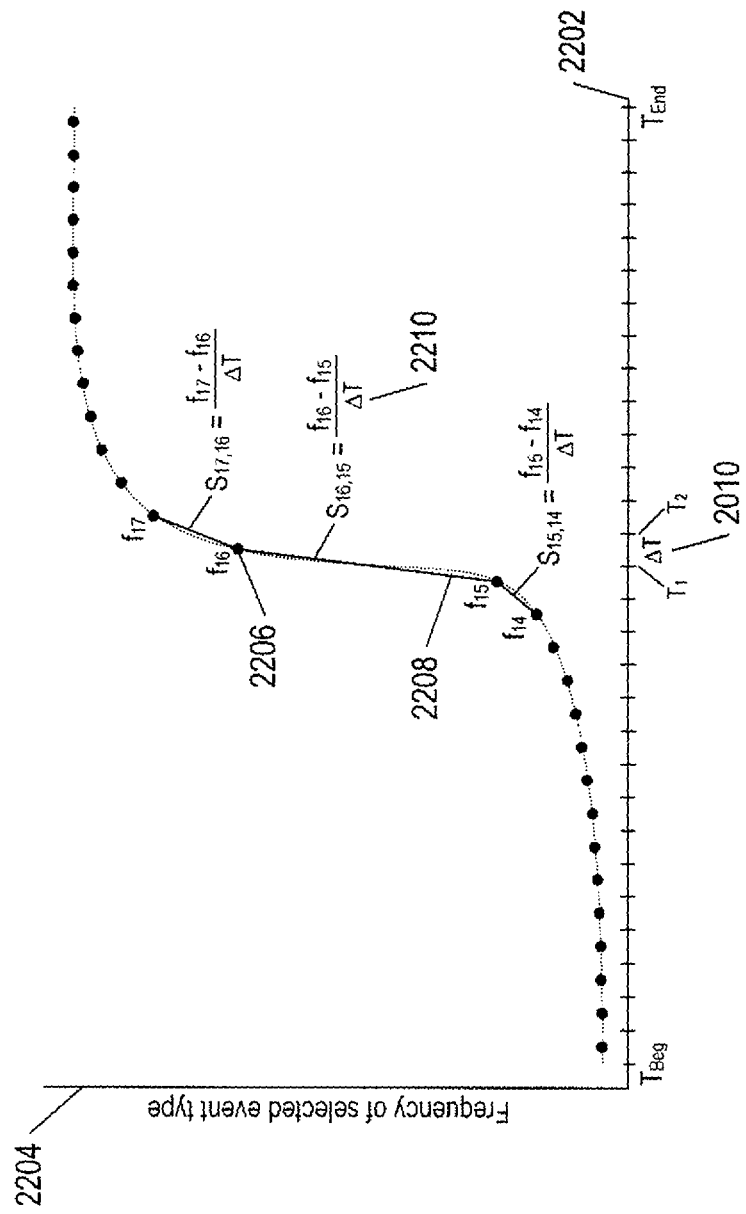
FIG. 22A shows a plot of frequencies of event messages with an event type that matches a selected event type.

In other implementations, the time interval with the greatest increase in frequency of the selected event may be indicated in order to aid a user. FIG. 22A shows a plot of frequencies of event messages with an event type that matches a selected event type. Horizontal axis 2202 represents time. Vertical axis 2204 represents frequency of a selected event type. Solid dots represent the frequencies of the event messages that match the selected event type described above with reference to FIG. 20. For example, dot 2206 represents the frequency of event messages with an event type that matches the event type of the selected even type generated within a time interval $[T_1, T_2]$ 2010, where $T_2 = T_1 + \Delta T$ and corresponds to the bar 2008 in FIG. 20. The slopes of lines connecting the frequencies of adjacent time intervals are used to identify a time interval of interest. The slope of frequencies of adjacent time intervals may be calculated as follows:

$$S_{i+1,i} = \frac{f_{i+1} - f_i}{\Delta T} \tag{3}$$

where i=1, . . . , M−1; and $f_{i+1}$ and $f_i$ are frequencies of event messages with an event type that matches a selected event type in adjacent time intervals.

Figure 22B:
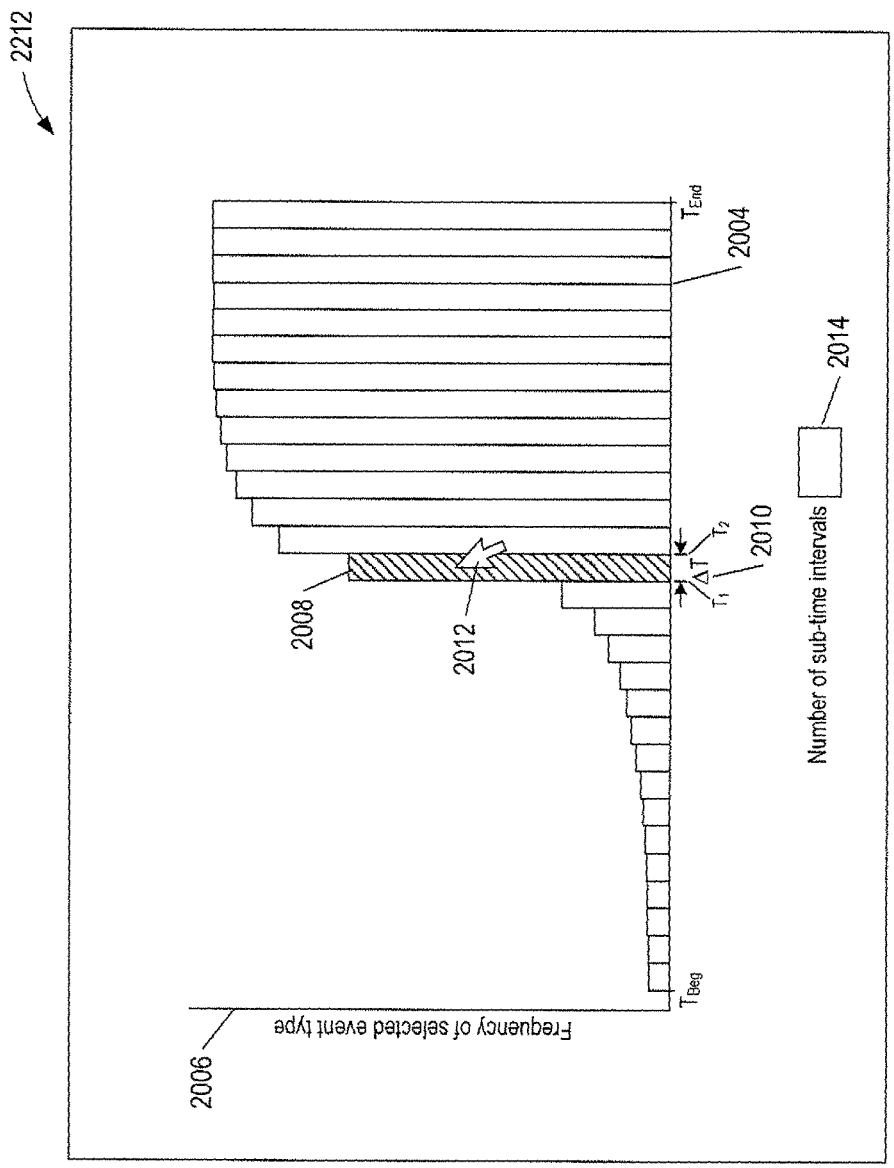
FIG. 22B shows an example of a GUI of frequencies of event messages that match a selected event type as a bar graph.

For example, in FIG. 22, the slop of the line 2208 connecting frequencies $f_{15}$ and $f_{16}$ of adjacent time intervals is $S_{16,15}$ 2210. The maximum slope is identified as $S_{p+1,p} = \max\{S_{i+1,i}\}_{i=1}^{M}$. The time interval with the frequency $f_{p+1}$ corresponding to the maximum $S_{p+1,p}$ may be used to highlight the bar of the bar graph in the GUI as having the largest increase in event messages with an event type that matches the selected event type. FIG. 22B shows a GUI 2212 with the bar graph shown in GUI of FIG. 20. The bar 2008 that corresponds to the largest increase in event messages is hash-marked in order to aid a user in identifying a time interval. The user may then click on the hash marked bar 2008 to obtain the GUI 2102 shown in FIG. 21.

Figure 23:
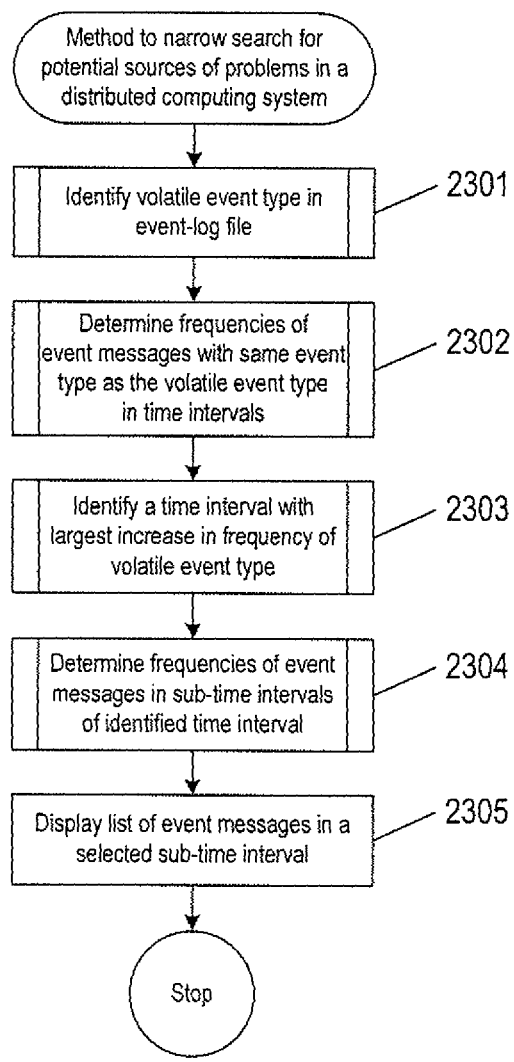
FIG. 23 shows a control-flow diagram of a method to narrow a search for potential sources of problems in a distributed computing system.

FIG. 23 shows a control-flow diagram of a method to narrow a search for potential sources of problems in a distributed computing system. In block 2301, a routine "identify volatile event type in event-log file" is called. The volatile event type is an event type that unexpectedly increased in frequency over an observation time window, as described above with reference to FIGS. 17A-17B. In block 2302, a routine "determine frequencies of event messages with same event type as the volatile event type in time intervals" of a historical period of time is called. In block 2303, a routing "identify a time interval with largest increase in frequency of volatile event type" is called. In block 2304, a routine "determine frequencies of event messages in sub-time intervals of identified time interval" is called. In block 2305, a list of event messages in a selected sub-time interval of the selected time interval are displayed, as described above with reference to FIG. 22B.

Figure 24:
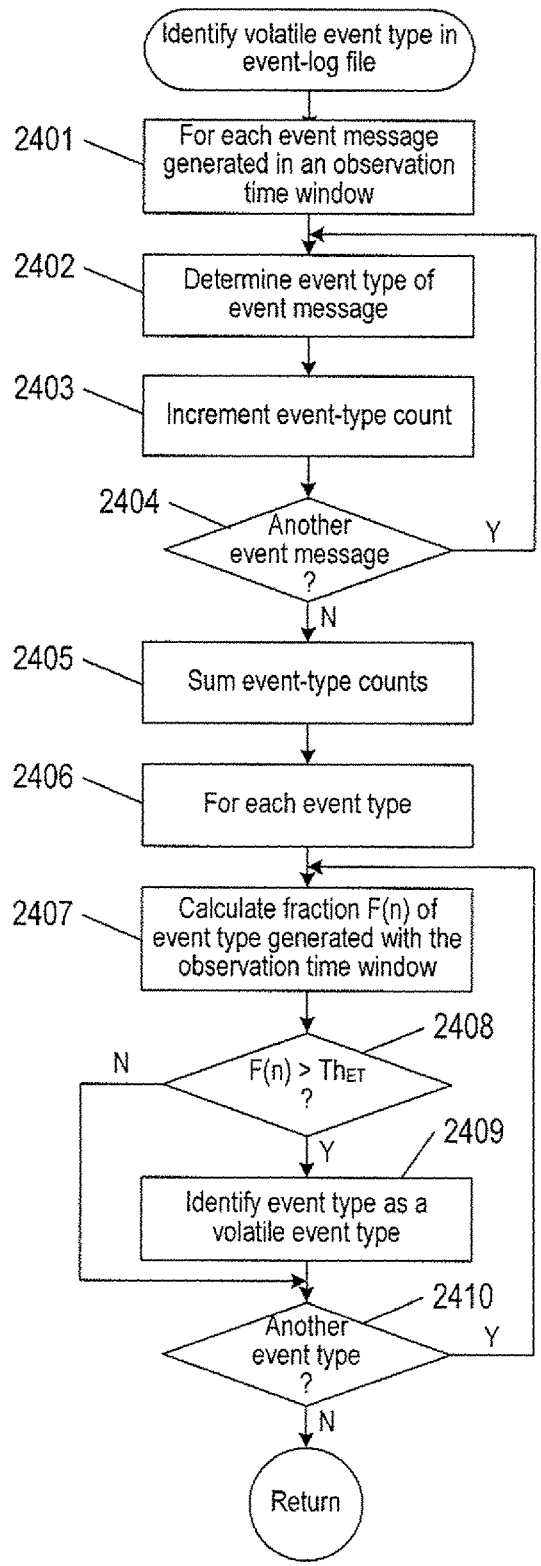
FIG. 24 shows a control-flow diagram of the routine "identify volatile event type in event-log file" called in FIG. 23.

FIG. 24 shows a control-flow diagram of the routine "identify volatile event type in event-log file" called in block 2301 of FIG. 23. A loop beginning with block 2401 repeats the operations of blocks 2402-2410 for each event message of an event-log file generated in an observation time window. In block 2402, event-type analysis is determined the event type of each event message as described above with reference to FIG. 19. In block 2403, an event-type count associated with the event type is incremented. In decision block 2402, the operations represented by blocks 2402 and 2403 are repeated for another event message. In block 2405, the event-type counts are summed as described above with reference to Equation (1b). A loop beginning with block 2406 repeats the operations represented by block 2407-2410 for each event type. In block 2407, a fraction F(n) of an event type generated in the observation time window is calculated as described above with reference to Equation (1a). In decision block 2408, when the fraction F(n) satisfies the condition given by Equation (2), control flows to block 2409 and the event type is identified as being a volatile event type. In decision block 2410, the operations of blocks 2407-2409 are repeated for another event type.

Figure 25:
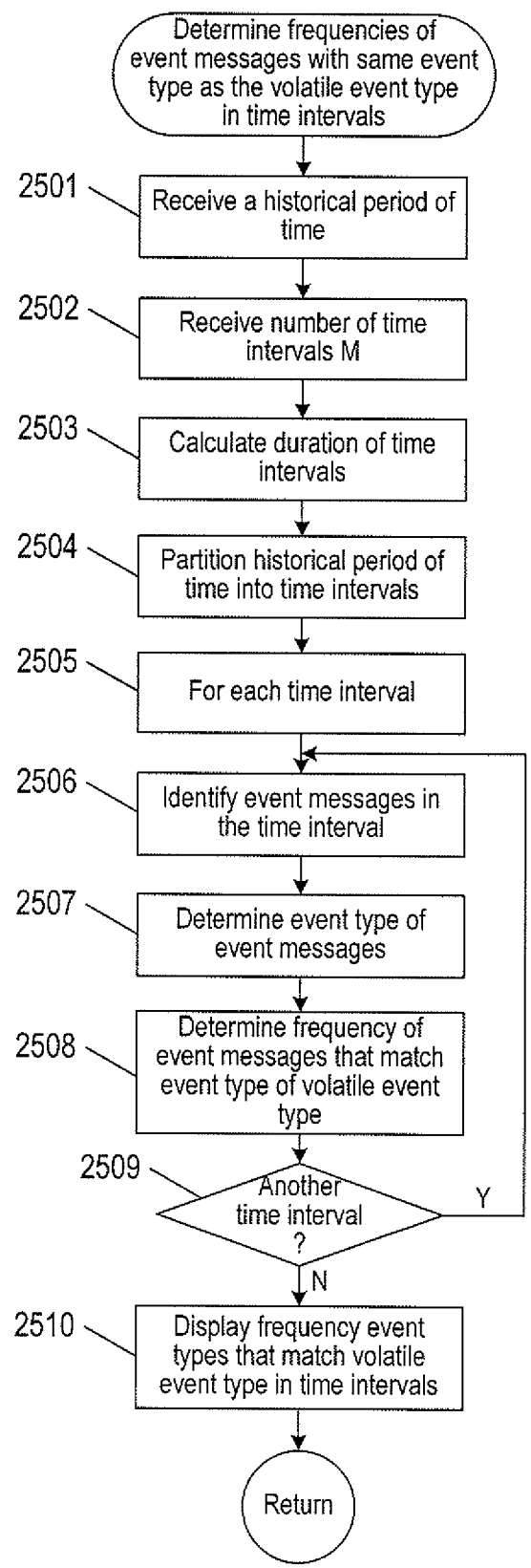
FIG. 25 shows a control-flow diagram of the routine "determine frequencies of event messages with same event type as the volatile event type in time intervals" called in FIG. 23.

FIG. 25 shows a control-flow diagram of the routine "determine frequencies of event messages with same event type as the volatile event type in time intervals" called in block 2302 of FIG. 23. In block 2501, a historical period of time is received as described above with reference to FIG. 17B. In block 2502, a number of time interval, M, is received as described above with reference to FIG. 17B. In block 2503, duration of time intervals of the historical period of time is calculated as described above with reference to FIG. 18. In block 2504, the historical period of time is partitioned into M time intervals, as described above with reference to FIG. 18. A loop beginning with block 2505 repeats the operations represented by blocks 2506-2509 for each time interval. In block 2506, event messages with time stamps in the time interval are identified. In block 2507, event-type analysis is used to identify the event type of each event message with a time stamp in the time interval. In block 2508, frequency of event messages that match volatile event type are determined, as described above with reference to FIG. 19. In decision block 2509, the operations represented by blocks 2506-2508 are repeated for another time interval of the historical period of time. In block 2510, frequencies of the event types that match the volatile event type are displayed in time intervals as described above with reference to FIG. 20.

Figure 26:
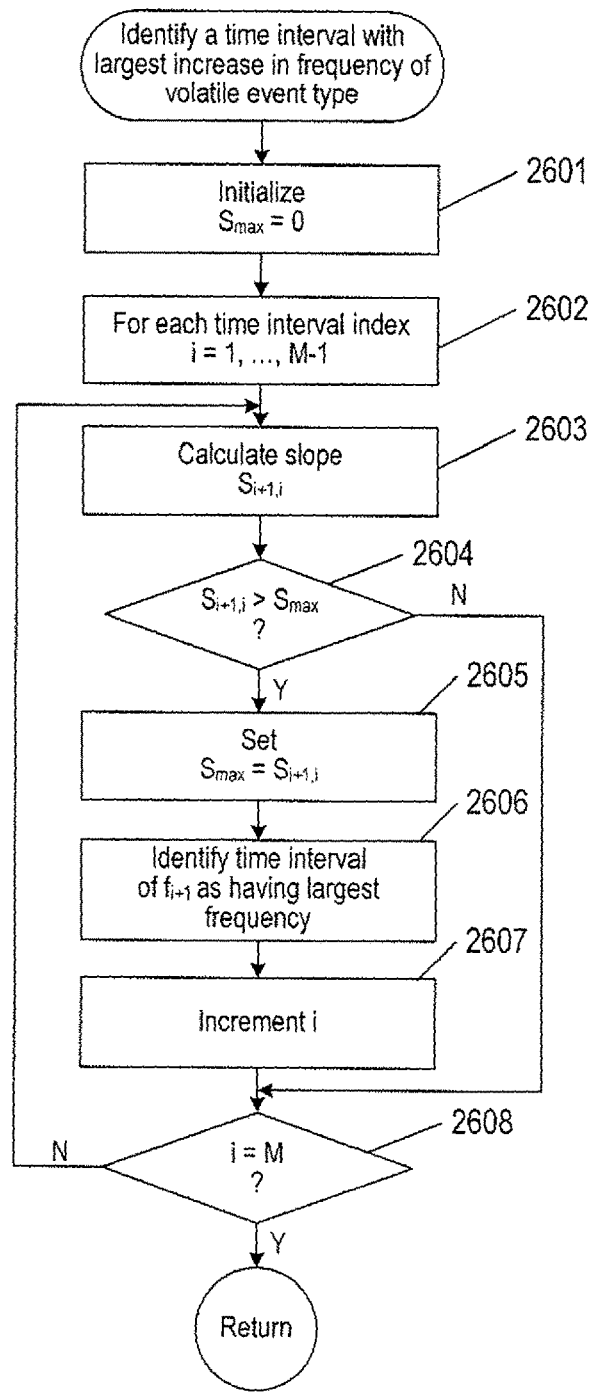
FIG. 26 shows a control-flow diagram of the routine "identify a time interval with largest increase in frequency of volatile event type" called in FIG. 23.

FIG. 26 shows a control-flow diagram of the routine "identify a time interval with largest increase in frequency of volatile event type" called in block 2303 of FIG. 23. In block 2601, a maximum slope parameter $S_{max}$ is initialized to zero. A loop beginning with block 2602 repeats the operations for each the time intervals indexed i=1, . . . M−1 as described above with reference to FIG. 22A. In block 2603, a slope $S_{i+1,i}$ is calculated as described above with reference to Equation (3). In decision block 2604, when the slope $S_{i+1,i}$ is greater than $S_{max}$, control flows to block 2605. In block 2605, the maximum slope parameter $S_{max}$ is set equal to the slope $S_{i+1,i}$. In block 2606, a time interval of the frequency $f_{i+1}$ is identified as having the largest frequency. In block 2607, the time interval index i is incremented. In decision block 2608, the operations represented by blocks 2603-2607 are repeated until the time interval index i equals M.

Figure 27:
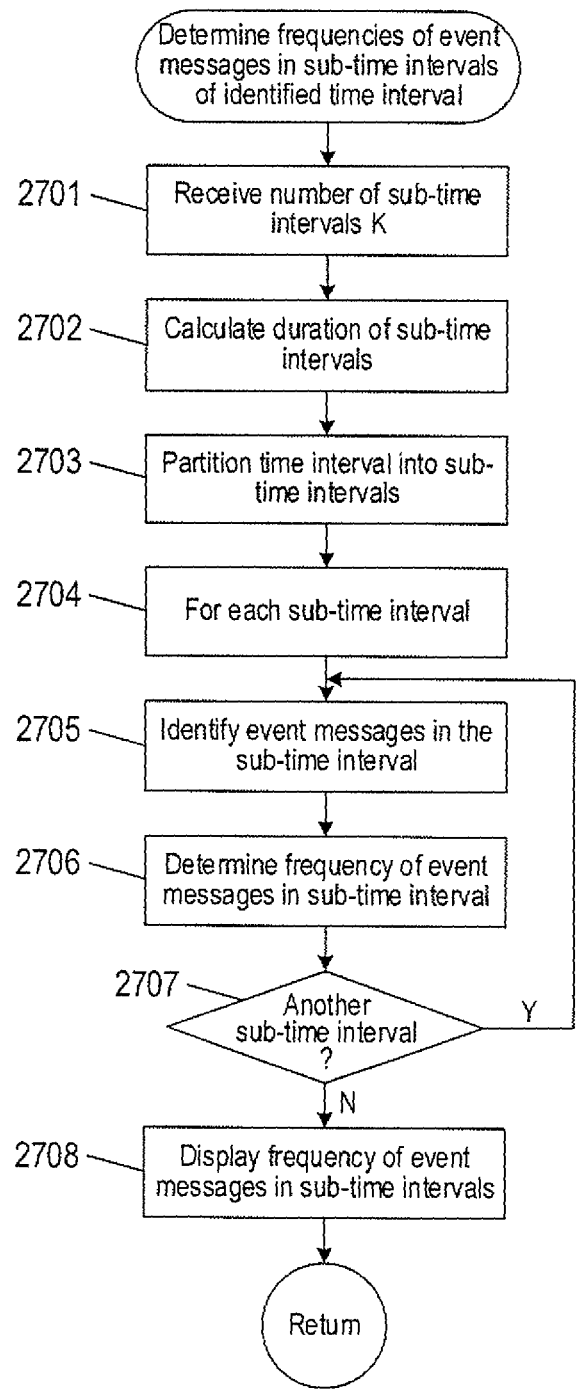
FIG. 27 shows control-flow diagram of the routine "determine frequencies of event messages in sub-time intervals of identified time interval" called in FIG. 23.

FIG. 27 shows control-flow diagram of the routine "determine frequencies of event messages in sub-time intervals of identified time interval" called in block 2304 of FIG. 23. In block 2701, a number of sub-time intervals K is received as described above with reference to FIG. 20. In block 2702, duration of sub-time intervals is calculated as described above with reference to FIG. 21. In block 2703, the time interval is partitioned as described above with reference to FIG. 21. A loop beginning with block 2704 repeats the operations represented by blocks 2705-2707 for each sub-time interval of the time interval In block 2705, event messages with time stamps in the sub-time interval are identified. In block 2706, frequency of event messages in the sub-time interval are determined, as described above with reference to FIG. 21. In decision block 2707, the operations represented by blocks 2705 and 2706 are repeated for another sub-time interval. In block 2708, the frequencies of event messages in the sub-time intervals are displayed, as described above with reference to FIG. 21.

The methods described above may be stored in a computer readable medium as machine readable instructions and executed on the computer system described above with reference to FIG. 1.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a computer system to narrow a search for potential sources of problems in a distributed computing system, the method comprising:
displaying on a display screen of the computer system a graphical user interface that identifies a volatile event type of event messages recorded in an event-log file recorded in an observation time window;
in response to a user selection of the volatile event type, displaying on the display screen a graphical user interface with a plot of frequencies of event messages in the event-log file with same event type as the volatile event type in time intervals of a historical period of time;
identifying a time interval of the time intervals of the historical period of time with a largest increase in frequency of event messages;
in response to a user selection of the identified time interval, displaying on the display screen a graphical user interface with frequencies of event messages of the event-log file in sub-time intervals of the time interval with the largest increase in frequency of event messages as the volatile event type; and
in response to a user selection of a sub-time interval, displaying on the display screen in a graphical user interface a list of event messages of the event-log file in the selected sub-time interval of the sub-time intervals of the time interval.

2. The method of claim 1, wherein displaying on the display screen the volatile event type of event messages recorded in the event-log file comprises:
determining event type of each event message generated in the observation time window:
determining frequency of each event type generated in the observation time window;
for each event type, calculating a fraction of the event type generated with the observation time window based on the frequency of the event type and total number of event messages generated in the observation time window; and
when the fraction of an event type is greater that a volatility threshold, identifying the event type as the volatile event type.

3. The method of claim 1, wherein displaying on the display screen the frequencies of event messages in time intervals of the historical period of time comprises:
partitioning the historical period of time into the time intervals, each time interval corresponding to a different time period of the historical period of time and having the same duration;
for each time interval,
determining an event type of each event message with a time stamp in the time interval; and
determining frequency of event messages with the same event type as the volatile event type.

4. The method of claim 1, wherein identifying the time interval with the largest increase in frequency of event messages comprises:
calculating a slope of a pair of frequencies of event messages for each pair of adjacent time intervals;
determining a largest slope of the slopes calculated for each pair of frequencies; and
identifying the time interval with the largest slope as the time interval with the largest slope as the time interval with the largest increase in frequency of event messages.

5. The method of claim 1, wherein displaying on the screen the frequencies of event messages of the event-log file in the sub-time interval of the time interval with the largest increase in frequency of event messages comprises:

receiving a constant that represents a number of sub-time intervals to partition the time interval into;
dividing a duration of the time interval by the constant to generate a duration of the sub-time intervals;
partitioning the time interval into the sub-time intervals, each sub-time interval corresponding to a different time period of the time interval and having the same duration; and
for each sub-time interval, determining a frequency of event messages generated within the sub-time interval.

6. The method of claim 1, further comprising:
performing event-type analysis of the list of event messages in the selected sub-time interval;
identifying event messages that are indicators of errors or failures based on the event types of the event messages; and
displaying on the display screen of the graphical user interface the event messages that are indicators of errors or failures in the sub-time interval.

7. A system to determine potential sources of problems in a distributed computing system, the system comprising:
one or more processors;
one or more data-storage devices;
a display screen; and
machine-readable instructions stored in the one or more data-storage devices that when executed using the one or more processors controls the system to carry out
displaying on a display screen of the computer system a graphical user interface that identifies a volatile event type of event messages recorded in an event-log file recorded in an observation time window;
in response to a user selection of the volatile event type, displaying on the display screen a graphical user interface with a plot of frequencies of event messages in the event-log file with same event type as the volatile event type in time intervals of a historical period of time;
identifying a time interval of the time intervals of the historical period of time with a largest increase in frequency of event messages;
in response to a user selection of the identified time interval, displaying on the display screen a graphical user interface with frequencies of event messages of the event-log file in sub-time intervals of the time interval with the largest increase in frequency of event messages as the volatile event type; and
in response to a user selection of a sub-time interval, displaying on the display screen in a graphical user interface displaying a list of event messages of the event-log file in the selected sub-time interval of the sub-time intervals of the time interval.

8. The system of claim 7, wherein displaying on the display screen the volatile event type of event messages recorded in the event-log file comprises:
determining event type of each event message generated in the observation time window:
determining frequency of each event type generated in the observation time window;
for each event type, calculating a fraction of the event type generated with the observation time window based on the frequency of the event type and total number of event messages generated in the observation time window; and
when the fraction of an event type is greater that a volatility threshold, identifying the event type as the volatile event type.

9. The system of claim 7, wherein displaying on the display screen the frequencies of event messages in time intervals of the historical period of time comprises:
  partitioning the historical period of time into the time intervals, each time interval corresponding to a different time period of the historical period of time and having the same duration;
  for each time interval,
    determining an event type of each event message with a time stamp in the time interval; and
    determining frequency of event messages with the same event type as the volatile event type.

10. The system of claim 7, wherein identifying the time interval with the largest increase in frequency of event messages comprises:
  calculating a slope of a pair of frequencies of event messages for each pair of adjacent time intervals;
  determining a largest slope of the slopes calculated for each pair of frequencies; and
  identifying the time interval with the largest slope as the time interval with the largest slope as the time interval with the largest increase in frequency of event messages.

11. The system of claim 7, wherein displaying on the screen the frequencies of event messages of the event-log file in the sub-time interval of the time interval with the largest increase in frequency of event messages comprises:
  receiving a constant that represents a number of sub-time intervals to partition the time interval into;
  dividing a duration of the time interval by the constant to generate a duration of the sub-time intervals;
  partitioning the time interval into the sub-time intervals, each sub-time interval corresponding to a different time period of the time interval and having the same duration; and
  for each sub-time interval, determining a frequency of event messages generated within the sub-time interval.

12. The system of claim 7, further comprising:
  performing event-type analysis of the list of event messages in the selected sub-time interval;
  identifying event messages that are indicators of errors or failures based on the event types of the event messages; and
  displaying on the display screen of the graphical user interface the event messages that are indicators of errors or failures in the sub-time interval.

13. A non-transitory computer-readable medium encoded with machine-readable instructions that implement a method carried out by one or more processors of a computer system to perform the operations of
  displaying on a display screen of the computer system a graphical user interface that identifies a volatile event type of event messages recorded in an event-log file recorded in an observation time window;
  in response to a user selection of the volatile event type, displaying on the display screen a graphical user interface with a plot of frequencies of event messages in the event-log file with same event type as the volatile event type in time intervals of a historical period of time;
  identifying a time interval of the time intervals of the historical period of time with a largest increase in frequency of event messages;
  in response to a user selection of the identified time interval, displaying on the display screen a graphical user interface with frequencies of event messages of the event-log file in sub-time intervals of the time interval with the largest increase in frequency of event messages as the volatile event type; and
  in response to a user selection of a sub-time interval, displaying on the display screen in a graphical user interface a list of event messages of the event-log file in the selected sub-time interval of the sub-time intervals of the time interval.

14. The medium of claim 13, wherein displaying on the display screen the volatile event type of event messages recorded in the event-log file comprises:
  determining event type of each event message generated in the observation time window:
  determining frequency of each event type generated in the observation time window;
  for each event type, calculating a fraction of the event type generated with the observation time window based on the frequency of the event type and total number of event messages generated in the observation time window; and
  when the fraction of an event type is greater that a volatility threshold, identifying the event type as the volatile event type.

15. The medium of claim 13, wherein displaying on the display screen the frequencies of event messages in time intervals of the historical period of time comprises:
  partitioning the historical period of time into the time intervals, each time interval corresponding to a different time period of the historical period of time and having the same duration;
  for each time interval,
    determining an event type of each event message with a time stamp in the time interval; and
    determining frequency of event messages with the same event type as the volatile event type.

16. The medium of claim 13, wherein identifying the time interval with the largest increase in frequency of event messages comprises:
  calculating a slope of a pair of frequencies of event messages for each pair of adjacent time intervals;
  determining a largest slope of the slopes calculated for each pair of frequencies; and
  identifying the time interval with the largest slope as the time interval with the largest slope as the time interval with the largest increase in frequency of event messages.

17. The medium of claim 13, wherein displaying on the screen the frequencies of event messages of the event-log file in the sub-time interval of the time interval with the largest increase in frequency of event messages comprises:
  receiving a constant that represents a number of sub-time intervals to partition the time interval into;
  dividing a duration of the time interval by the constant to generate a duration of the sub-time intervals;
  partitioning the time interval into the sub-time intervals, each sub-time interval corresponding to a different time period of the time interval and having the same duration; and
  for each sub-time interval, determining a frequency of event messages generated within the sub-time interval.

18. The medium of claim 13, further comprising:
  performing event-type analysis of the list of event messages in the selected sub-time interval;
  identifying event messages that are indicators of errors or failures based on the event types of the event messages; and displaying on the display screen of the graphical user interface the event messages that are indicators of errors or failures in the sub-time interval.

\* \* \* \* \*